(12) United States Patent
Chandramani et al.

(10) Patent No.: US 11,934,695 B2
(45) Date of Patent: Mar. 19, 2024

(54) ALIGNED COMMAND BASED FIRMWARE ARCHITECTURE FOR UNALIGNED WRITE HANDLING

(71) Applicant: Western Digital Technologies, Inc., San Jose, CA (US)

(72) Inventors: Chandramani, Karnataka (IN); Dinesh Agarwal, Karnataka (IN); Sharath Shivakumar, Karnataka (IN); Ruchir Sinha, Karnataka (IN)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 20 days.

(21) Appl. No.: 17/356,054

(22) Filed: Jun. 23, 2021

(65) Prior Publication Data

US 2022/0413756 A1 Dec. 29, 2022

(51) Int. Cl.
*G06F 3/06* (2006.01)

(52) U.S. Cl.
CPC .......... *G06F 3/0659* (2013.01); *G06F 3/0604* (2013.01); *G06F 3/0673* (2013.01)

(58) Field of Classification Search
CPC ..... G06F 3/0659; G06F 3/0604; G06F 3/0673
See application file for complete search history.

(56) References Cited

U.S. PATENT DOCUMENTS

| | | | |
|---|---|---|---|
| 9,195,530 B1 | 11/2015 | Jean | |
| 9,703,491 B2 | 7/2017 | Mathur et al. | |
| 9,996,457 B2 * | 6/2018 | Post | G06F 12/0246 |
| 10,372,603 B2 * | 8/2019 | Muthiah | G06F 3/0679 |
| 10,430,330 B2 | 10/2019 | Jain | |
| 2015/0121021 A1 * | 4/2015 | Nakamura | G06F 3/0659 711/159 |
| 2019/0114255 A1 * | 4/2019 | Jain | G06F 3/068 |
| 2019/0163620 A1 * | 5/2019 | Muthiah | G06F 9/3013 |
| 2020/0242045 A1 | 7/2020 | Ramamurthy et al. | |

OTHER PUBLICATIONS

TechTarget Contributor, "parallel processing", Sep. 2019, pp. 1-4, https://www.techtarget.com/searchdatacenter/definition/parallel-processing (Year: 2019).*

* cited by examiner

*Primary Examiner* — Charles Rones
*Assistant Examiner* — Alexander Vinnitsky
(74) *Attorney, Agent, or Firm* — ArentFox Schiff LLP

(57) ABSTRACT

Aspects of a storage device including a memory and a controller are provided. The controller may convert unaligned write commands into aligned write commands and generate unaligned information associated with the unaligned write commands. In some aspects, the unaligned information indicates offset information for each unaligned write command. The controller may accumulate a threshold size of aligned write command transfer sizes in an aggregation command queue and fetch pre-pad or post-pad data for each unaligned write command in parallel based on the aggregation command queue having accumulated the threshold size of aligned write command transfer sizes. The controller may transfer host data for each unaligned write command to a data buffer at a corresponding offset within the data buffer based on the unaligned information. The controller may generate aligned data using the pre-pad or post-pad data combined with the host data and program the aligned data into a memory die.

20 Claims, 25 Drawing Sheets

ALIGNED COMMAND BASED FIRMWARE ARCHITECTURE FOR UNALIGNED WRITE HANDLING

BACKGROUND

Field

This disclosure is generally related to electronic devices and more particularly to storage devices.

Introduction

Storage devices enable users to store and retrieve data. Examples of storage devices include non-volatile memory devices. A non-volatile memory generally retains data after a power cycle. An example of a non-volatile memory is a flash memory, which may include array(s) of Not-And (NAND) flash memory cells on one or more dies. Flash memory may be found in solid-state devices (SSDs), Secure Digital (SD) cards, Universal Serial Bus (USB) cards, and the like.

A flash storage device may store control information associated with data. For example, a flash storage device may maintain control tables that include a mapping between logical addresses received by the memory subsystem from a host, and physical addresses within the memory cell array. These control tables are used to track the physical location of logical sectors, or blocks, in the flash memory. The control tables are stored in the non-volatile memory to enable access to the stored data after a power cycle.

When writing data to cells of the flash memory, the flash storage device may identify the physical address of a block associated with a logical address, and may then apply a program voltage to a word line of the block at the identified physical address to program the data into the cells coupled to that word line. However, various challenges are presented in mapping logical-to-physical addresses in non-volatile memory systems that impacts the write performance.

SUMMARY

Various embodiments are described herein for operating a nonvolatile memory, e.g., a NAND, a Bit Cost Scalable (BiCS) memory or the like. The memory can be operated to handle unaligned writes based on aligned command based firmware architecture using hardware assisted write caching.

One aspect of a storage device is disclosed herein. The storage device includes a memory and a controller. The controller is coupled to the memory and configured to convert unaligned host write commands into aligned host write commands. The controller may generate unaligned information associated with the unaligned host write commands. In some aspects, the unaligned information indicating offset information for each of the unaligned host write commands. The controller may accumulate the aligned host write commands up to a threshold size of aggregated command transfer sizes. The controller may transfer host data to a data buffer at predefined offsets based on the unaligned information for each corresponding aligned host write command. The controller may modify the data buffer to add pad data to empty sectors within the data buffer based on the predefined offsets included in the unaligned information. The controller may program a memory die in the memory with the modified host data.

Another aspect of a storage device is disclosed herein. The storage device includes a memory and a controller. The memory includes a plurality of memory dies. The controller is coupled to the memory and configured to receive one or more host write commands from a host device. The controller may determine that the one or more host write commands comprise unaligned write commands. The controller may convert the unaligned write commands into aligned write commands. The controller may generate unaligned information associated with the unaligned write commands. In some aspects, the unaligned information indicating offset information for each of the unaligned write commands. The controller may accumulate the aligned write commands in an aggregation command queue. The controller may determine whether the aggregation command queue has accumulated a transfer size of the aligned write commands that corresponds to a threshold size of aggregated command transfer sizes, and fetch one or more of pre-pad data or post-pad data for each of the unaligned write commands in parallel when the aggregation command queue has accumulated a transfer size of the aligned write commands that corresponds to the threshold size of aggregated command transfer sizes. The controller may transfer host data for each of the unaligned write commands to a data buffer at a corresponding offset within the data buffer based on the unaligned information. The controller may combine the one or more of the pre-pad data or post-pad data with the host data to generate aligned data. The controller may program the aligned data into at least one of the plurality of memory dies.

A further aspect of a storage device is disclosed herein. The storage device includes a plurality of memory dies and a controller. The controller is coupled to the plurality of memory dies and configured to convert unaligned write commands into aligned write commands. The controller may generate unaligned information associated with the unaligned write commands. In some aspects, the unaligned information indicating offset information for each of the unaligned write commands. The controller may accumulate a threshold size of aligned write command transfer sizes in an aggregation command queue. The controller may fetch one or more of pre-pad data or post-pad data for each of the unaligned write commands in parallel based on the aggregation command queue having accumulated the threshold size of the aligned write command transfer sizes. The controller may transfer host data for each of the unaligned write commands to a data buffer at a corresponding offset within the data buffer based on the unaligned information. The controller may generate aligned data using the one or more of the pre-pad data or post-pad data combined with the host data. The controller may perform a write operation that programs the aligned data into at least one of the plurality of memory dies.

It is understood that other aspects of the storage device will become readily apparent to those skilled in the art from the following detailed description, wherein various aspects of apparatuses and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

BRIEF DESCRIPTION OF THE DRAWINGS

Various aspects of the present invention will now be presented in the detailed description by way of example, and not by way of limitation, with reference to the accompanying drawings.

DETAILED DESCRIPTION

Figure 1:
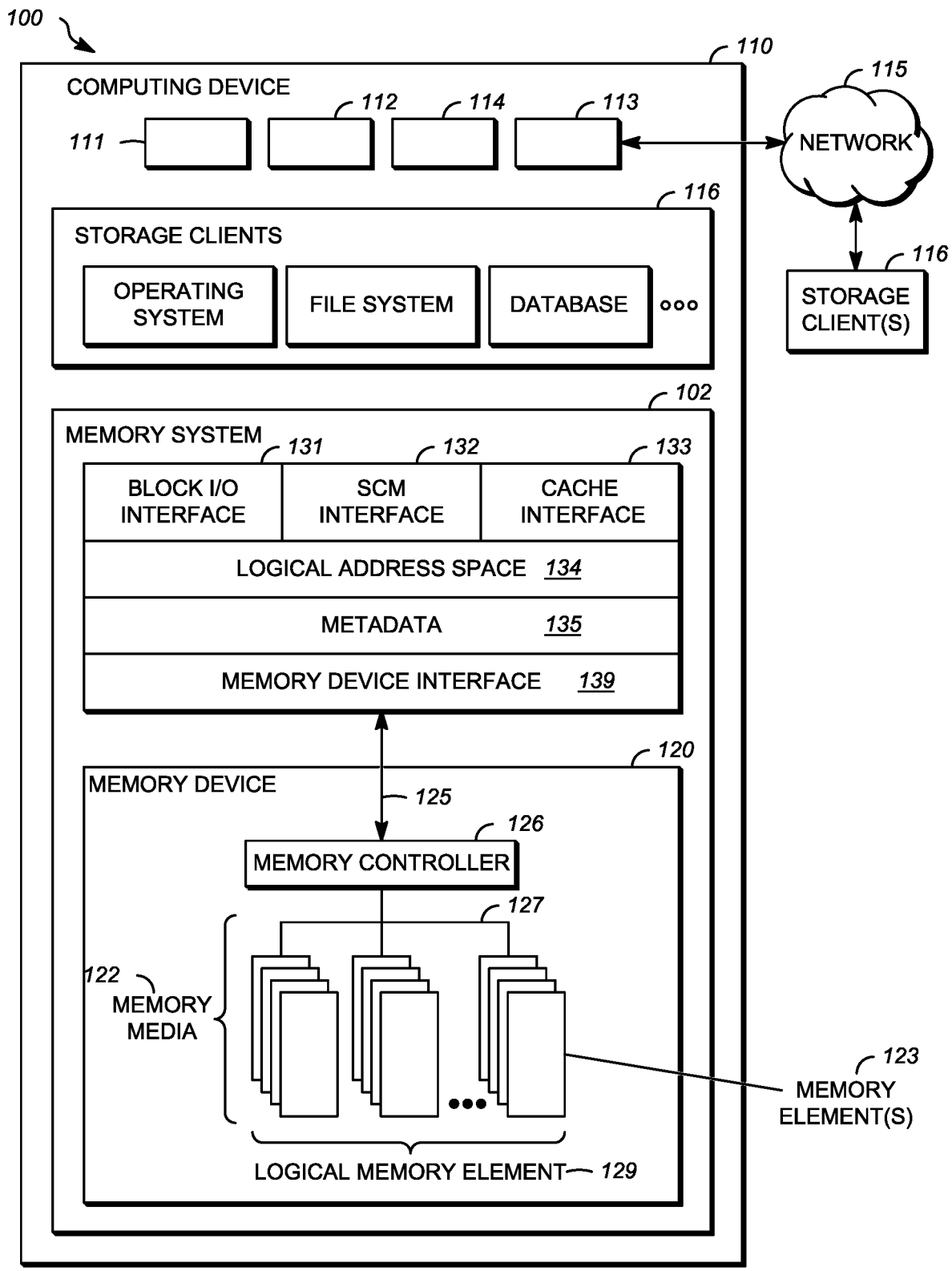
FIG. 1 illustrates a schematic block diagram illustrating an embodiment of a memory system.

When a host device writes data to and reads data from a storage device, the host writes and reads data in terms of logical block addresses (LBAs). The basic unit of data transfer between the host and storage device is referred to herein as a "sector." By "basic unit" it is meant that this is the minimum size of data transfer for a read or write command. A request to read or write is thus a request to read or write some integer number of sectors. The size of a sector may vary from one implementation to the next, but one example of a sector size is 512 bytes. Note that the term "sector" as used herein does not refer to a physical sector on a hard disk drive, or the like. Also note that each LBA corresponds to a sector.

The storage device typically has a memory controller, which translates the LBAs to physical addresses of memory cells on the storage device. As one example, a flash memory device has a Flash Transfer Layer (FTL) or Media Management Layer (MML) that performs a logical address to physical address translation.

Prior to writing data to the memory cells, the memory controller typically forms a codeword from the data from the host. The codeword includes the host data and one or more parity bits. The number of parity bits may vary, depending on the strength of the error correction code (ECC). The codeword is referred to herein as an "ECC page." An ECC page is formed from one or more sectors of host data. As one example, an ECC page may be formed from four sectors of host data. Thus, if sector size is 512 Bytes, an ECC page may contain 2K bytes of host data, plus parity bits. An ECC page is a unit of programming in the storage device.

The memory controller has a minimum write unit length, which is typically one or more ECC pages. Thus, the minimum write unit length corresponds to some number of sectors. The term "fragment" is used herein to refer to the minimal addressable unit of memory in the storage device. As one example, if the minimum write unit length is two ECC pages, then the minimum write unit length is 4 KB (assuming 512 Byte sector and four sectors per ECC page).

An aligned write command is defined as one in which the start LBA and data size is a multiple of the number of sectors in the fragment. For example, if there are eight sectors in a fragment, then an aligned write command has a start LBA that is a multiple of eight and data size that is a integer multiple of eight sectors.

A write command that is not an aligned write command is referred to as an unaligned write command. Thus, an unaligned write command either: 1) has a start LBA that is not a multiple of the number of sectors in the fragment; or 2) has a data size that is not a multiple of the number of sectors in the fragment.

When a host sends an aligned write command, the data can simply be written to the memory die as one or more fragments. However, when a host sends an unaligned write command, the memory controller needs to add pre-pad data and/or post-pad data to the host data to form "aligned data." By aligned data it is meant that a complete fragment is formed. The memory controller may need to read the pre-pad and/or post-pad data from memory cells. Thus, the memory controller may need to perform a read-modify-write. A read-modify-write refers to reading in pre-pad and/or post-pad data from memory cells on the memory die, forming a fragment of aligned data by updating recent transferred host sector data into this fragment, and writing the fragment of aligned data to the memory die.

Performing individual pre-pad/post-pad reads in sequence and thereafter read-modify-writes can be quite time consuming. Moreover, handling unaligned write commands by performing pre-pad/post-pad reads one by one can increase pre-pad/post-pad sector read latency. Pre-pad/post-pad sector read latency can reduce the write performance of the storage device.

The present disclosure provides for enabling unaligned write aggregation and caching in hardware assisted write caching unit in the memory controller. The memory controller can enable aligned command based firmware to adapt to unaligned command along with hardware assisted write caching. The memory controller can aggregate the unaligned writes while host sector transfers take place, triggering the pre-pad/post-pad sectors to be read in parallel. The memory controller can perform a read-modify-write operation to combine the pre-pad/post-pad data with the host data to complete the aligned data and thereafter program the NAND. The subject technology improves the unaligned write performance and increases the die utilization in non-blocking firmware architecture.

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention. Acronyms and other descriptive terminology may be used merely for convenience and clarity and are not intended to limit the scope of the invention.

The words "exemplary" and "example" are used herein to mean serving as an example, instance, or illustration. Any exemplary embodiment described herein as "exemplary" is not necessarily to be construed as preferred or advantageous over other exemplary embodiments. Likewise, the term "exemplary embodiment" of an apparatus, method or article of manufacture does not require that all exemplary embodiments of the invention include the described components, structure, features, functionality, processes, advantages, benefits, or modes of operation.

As used herein, the term "coupled" is used to indicate either a direct connection between two components or, where appropriate, an indirect connection to one another through intervening or intermediate components. In contrast, when a component referred to as being "directly coupled" to another component, there are no intervening elements present.

In the following detailed description, various aspects of a storage device in communication with a host device will be presented. These aspects are well suited for flash storage devices, such as SSDs, USB and SD cards. However, those skilled in the art will realize that these aspects may be extended to all types of storage devices capable of storing data. Accordingly, any reference to a specific apparatus or method is intended only to illustrate the various aspects of the present invention, with the understanding that such aspects may have a wide range of applications without departing from the spirit and scope of the present disclosure.

FIG. 1 is a schematic block diagram illustrating an embodiment of a system 100 and device 110 for unaligned write handling. As used herein, an "subgroup selection circuit" refers to a circuit utilized to identify a programming speed for a subgroup of memory cells (e.g., a group or a tier group of memory cells) in relation to at least one other subgroup of memory cells and select the identified subgroup of memory cells for use in at least one programming operation. In some embodiments, a memory device 120 can at least partially operate on and/or in communication with a nonvolatile and/or volatile memory system 102 of a computing device 110, which can include a processor 111, volatile memory 112, and a communication interface 113. The processor 111 can include one or more central processing units, one or more general-purpose processors, one or more application-specific processors, one or more virtual processors (e.g., the computing device 110 can be a virtual machine operating within a host), one or more processor cores, or the like. The communication interface 113 can include one or more network interfaces configured to communicatively couple the computing device 110 and/or memory controller 126 to a communication network 115, such as an Internet Protocol (IP) network, a Storage Area Network (SAN), wireless network, wired network, or the like.

The memory device 120, in various embodiments, can be disposed in one or more different locations relative to the computing device 110. In one embodiment, the memory device 120 includes one or more non-volatile and/or volatile memory elements 123, such as semiconductor chips or packages or other integrated circuit devices disposed on one or more printed circuit boards, storage housings, and/or other mechanical and/or electrical support structures. For example, the memory device 120 can include one or more direct inline memory module (DIMM) cards, one or more expansion cards and/or daughter cards, a memory card, a universal serial bus (USB) drive, a solid-state-drive (SSD) or other hard drive device, and/or can have another memory and/or storage form factor. The memory device 120 can be integrated with and/or mounted on a motherboard of the computing device 110, installed in a port and/or slot of the computing device 110, installed on a different computing device 110 and/or a dedicated storage appliance on the network 115, in communication with the computing device 110 over an external bus (e.g., an external hard drive), or the like.

The memory device 120, in one embodiment, can be disposed on a memory bus of a processor 111 (e.g., on the same memory bus as the volatile memory 112, on a different memory bus from the volatile memory 112, in place of the volatile memory 112, or the like). In a further embodiment, the memory device 120 can be disposed on a peripheral bus of the computing device 110, such as a peripheral component interconnect express (PCI Express or PCIe) bus, a serial Advanced Technology Attachment (SATA) bus, a parallel Advanced Technology Attachment (PATA) bus, a small computer system interface (SCSI) bus, a FireWire bus, a Fibre Channel connection, a Universal Serial Bus (USB), a PCIe Advanced Switching (PCIe-AS) bus, or the like. In another embodiment, the memory device 120 can be disposed on a data network 115, such as an Ethernet network, an Infiniband network, SCSI RDMA over a network 115, a storage area network (SAN), a local area network (LAN), a wide area network (WAN) such as the Internet, another wired and/or wireless network 115, or the like.

The computing device 110 can further include a non-transitory, computer readable storage medium 114. The computer readable storage medium 114 can include executable instructions configured to cause the computing device 110 (e.g., processor 111) to perform steps of one or more of the methods disclosed herein.

According to various embodiments, a memory controller 126 can manage one or more memory devices 120 and/or memory elements 123. The memory device(s) 120 can include recording, memory, and/or storage devices, such as solid-state storage device(s) and/or semiconductor storage device(s) that are arranged and/or partitioned into a plurality of addressable media storage locations. As used herein, a media storage location refers to any physical unit of memory (e.g., any quantity of physical storage media on a memory device 120). Memory units and/or regions can include, but are not limited to: pages, memory divisions, blocks, sectors, collections or sets of physical storage locations (e.g., logical pages, logical blocks), or the like.

A device driver and/or the memory controller 126, in certain embodiments, can present a logical address space 134 to the storage clients 116. As used herein, a logical address space 134 refers to a logical representation of memory resources. The logical address space 134 can include a plurality (e.g., range) of logical addresses. As used herein, a logical address refers to any identifier for referencing a memory resource (e.g., data), including, but not limited to: a logical block address (LBA), cylinder/head/sector (CHS) address, a file name, an object identifier, an inode, a Universally Unique Identifier (UUID), a Globally Unique Identifier (GUID), a hash code, a signature, an index entry, a range, an extent, or the like.

A device driver for the memory device 120 can maintain metadata 135, such as a logical to physical address mapping structure to map logical addresses of the logical address space 134 to media storage locations on the memory device(s) 120. A device driver can be configured to provide storage services to one or more storage clients 116. The storage clients 116 can include local storage clients 116 operating on the computing device 110 and/or remote storage clients 116 accessible via the network 115 and/or network interface 113. The storage clients 116 can include, but are not limited to: operating systems, file systems, database applications, server applications, kernel-level processes, user-level processes, applications, and the like.

A device driver can be communicatively coupled to one or more memory devices 120. The one or more memory devices 120 can include different types of memory devices including, but not limited to: solid-state storage devices, semiconductor storage devices, SAN storage resources, volatile memory devices, non-volatile memory devices, or the like. The one or more memory devices 120 can include one or more respective memory media controllers 126 and memory media 122. A device driver can provide access to the one or more memory devices 120 via a traditional block I/O interface 131. Additionally, a device driver can provide access to enhanced functionality through the SCM interface 132. The metadata 135 can be used to manage and/or track data operations performed through any of the Block I/O interface 131, SCM interface 132, cache interface 133, or other related interfaces.

The cache interface 133 can expose cache-specific features accessible via a device driver for the memory device 120. Also, in some embodiments, the SCM interface 132 presented to the storage clients 116 provides access to data transformations implemented by the one or more memory devices 120 and/or the one or more memory media controllers 126.

A device driver can present a logical address space 134 to the storage clients 116 through one or more interfaces. As discussed above, the logical address space 134 can include a plurality of logical addresses, each corresponding to respective media locations on one or more memory devices 120. A device driver can maintain metadata 135 comprising any-to-any mappings between logical addresses and media locations, or the like.

A device driver can further include and/or be in communication with a memory device interface 139 configured to transfer data, commands, and/or queries to the one or more memory devices 120 over a bus 125, which can include, but is not limited to: a memory bus of a processor 111, a peripheral component interconnect express (PCI Express or PCIe) bus, a serial Advanced Technology Attachment (ATA) bus, a parallel ATA bus, a small computer system interface (SCSI), FireWire, Fibre Channel, a Universal Serial Bus (USB), a PCIe Advanced Switching (PCIe-AS) bus, a network 115, Infiniband, SCSI RDMA, or the like. The memory device interface 139 can communicate with the one or more memory devices 120 using input-output control (IO-CTL) command(s), IO-CTL command extension(s), remote direct memory access, or the like.

The communication interface 113 can include one or more network interfaces configured to communicatively couple the computing device 110 and/or the memory controller 126 to a network 115 and/or to one or more remote, network-accessible storage clients 116. The storage clients 116 can include local storage clients 116 operating on the computing device 110 and/or remote storage clients 116 accessible via the network 115 and/or the network interface 113. The memory controller 126 is part of and/or in communication with one or more memory devices 120. Although FIG. 1 depicts a single memory device 120, the disclosure is not limited in this regard and could be adapted to incorporate any number of memory devices 120, a combination of one or more volatile memory devices 120 and one or more non-volatile memory devices 120, or the like.

The memory device 120 can include one or more elements 123 of memory media 122. In one embodiment, an element 123 of memory media 122 includes a volatile memory medium 122, such as random-access memory (RAM), dynamic RAM (DRAM), synchronous DRAM (SDRAM), double data rate (DDR) SDRAM, static RAM (SRAM), thyristor RAM (T-RAM), zero-capacitor RAM (Z-RAM), or the like. In certain embodiments, an element 123 of memory media 122 includes a non-volatile memory medium 122, such as ReRAM, Memristor memory, programmable metallization cell memory, phase-change memory (PCM, PCME, PRAM, PCRAM, ovonic unified memory, chalcogenide RAM, or C-RAM), NAND flash memory (e.g., 2D NAND flash memory, 3D NAND flash memory), NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS) memory, programmable metallization cell (PMC) memory, conductive-bridging RAM (CBRAM), magneto-resistive RAM (MRAM), magnetic storage media (e.g., hard disk, tape), optical storage media, or the like. Thus, the memory device 120 may rely, for example, on stored voltage levels or stored resistance levels. The one or more elements 123 of memory media 122, in certain embodiments, include storage class memory (SCM).

While legacy technologies such as NAND flash can be block and/or page addressable, storage class memory, in one embodiment, is byte addressable. In further embodiments, storage class memory can be faster and/or have a longer life (e.g., endurance) than NAND flash; can have a lower cost, use less power, and/or have a higher storage density than DRAM; or offer one or more other benefits or improvements when compared to other technologies. For example, storage class memory can include one or more non-volatile memory elements 123 of ReRAM, Memristor memory, programmable metallization cell memory, phase-change memory, nano RAM, nanocrystal wire-based memory, silicon-oxide based sub-10 nanometer process memory, graphene memory, SONOS memory, PMC memory, CBRAM, MRAM, and/or variations thereof.

While the non-volatile memory media 122 is referred to herein as "memory media," in various embodiments, the non-volatile memory media 122 can more generally include one or more non-volatile recording media capable of recording data, which can be referred to as a non-volatile memory medium, a non-volatile storage medium, or the like. Further, the nonvolatile memory device 120, in various embodiments, can include a non-volatile recording device, a non-volatile memory device, a non-volatile storage device, or the like. Similarly, a nonvolatile memory element 123, in various embodiments, can include a non-volatile recording element, a non-volatile memory element, a non-volatile storage element, or the like.

The non-volatile memory media 122 can include one or more non-volatile memory elements 123, which can include, but are not limited to: chips, packages, planes, die, or the like. A non-volatile memory controller 126 can be configured to manage data operations on the nonvolatile memory media 122, and can include one or more processors, programmable processors (e.g., FPGAs), ASICs, micro-controllers, or the like. In some embodiments, the nonvolatile memory controller 126 is configured to store data on and/or read data from the nonvolatile memory media 122, to transfer data to/from the non-volatile memory device 120, and so on.

The non-volatile memory controller 126 can be communicatively coupled to the non-volatile memory media 122 by way of a bus 127. The bus 127 can include an I/O bus for communicating data to/from the non-volatile memory elements 123. The bus 127 can further include a control bus for communicating addressing, and other command and control information to the non-volatile memory elements 123. In some embodiments, the bus 127 can communicatively couple the non-volatile memory elements 123 to the non-volatile memory controller 126 in parallel. This parallel access can allow the non-volatile memory elements 123 to be managed as a group, forming a logical memory element 129. The logical memory element can be partitioned into respective logical memory units (e.g., logical pages) and/or logical memory divisions (e.g., logical blocks). The logical memory units can be formed by logically combining physical memory units of each of the non-volatile memory elements.

The non-volatile memory controller 126 can include and/or be in communication with a device driver executing on the computing device 110. A device driver can provide storage services to the storage clients 116 via one or more interfaces 131, 132, and/or 133. In some embodiments, a device driver provides a block-device I/O interface 131 through which storage clients 116 perform block-level I/O operations. Alternatively, or in addition, a device driver can provide a storage class memory (SCM) interface 132, which can provide other storage services to the storage clients 116. In some embodiments, the SCM interface 132 can include extensions to the block device interface 131 (e.g., storage clients 116 can access the SCM interface 132 through extensions or additions to the block device interface 131). Alternatively, or in addition, the SCM interface 132 can be provided as a separate API, service, and/or library. A device driver can be further configured to provide a cache interface 133 for caching data using the non-volatile memory system 102. A device driver can further include a non-volatile memory device interface 139 that is configured to transfer data, commands, and/or queries to the non-volatile memory controller 126 over a bus 125, as described above.

Figure 2:
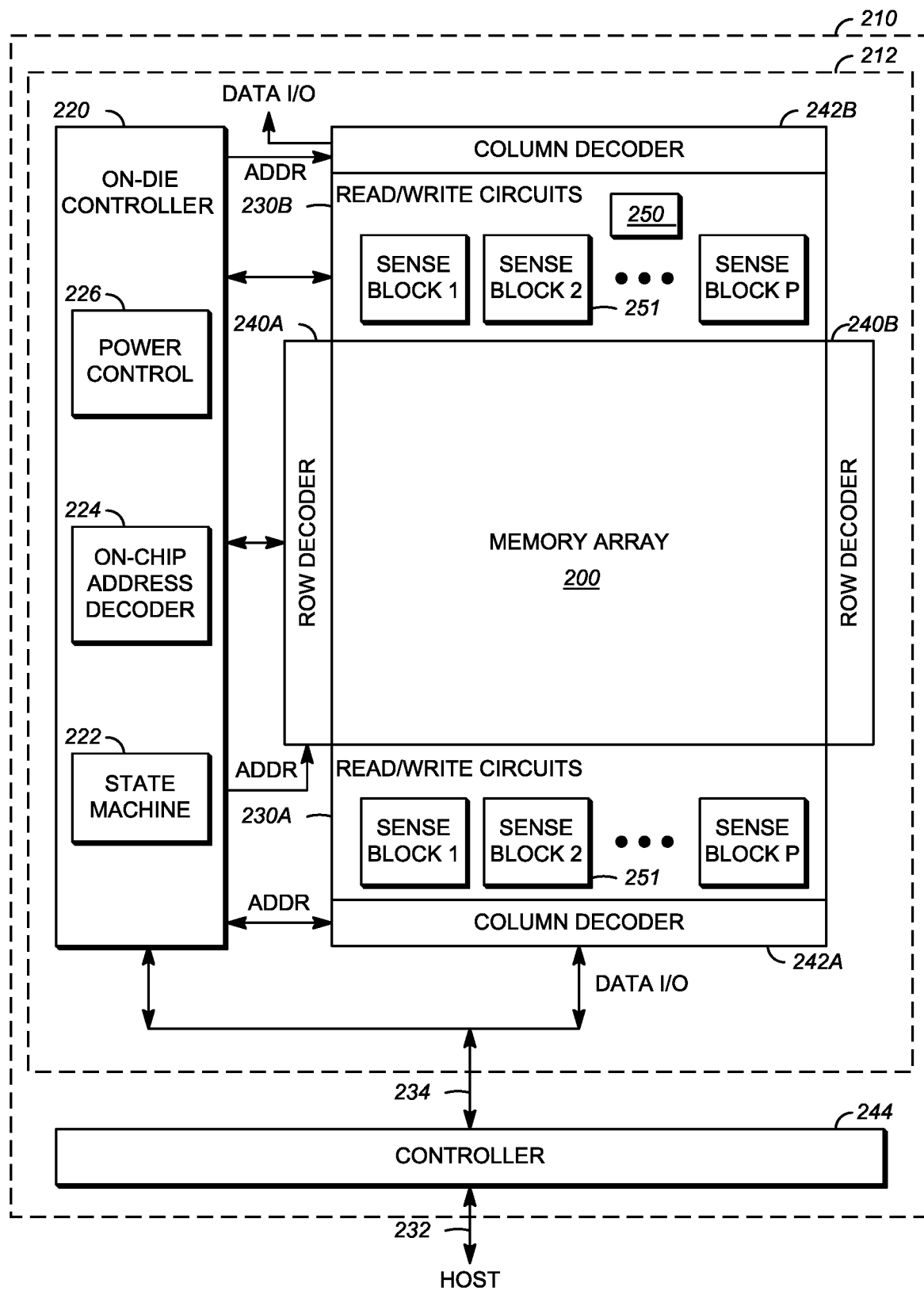
FIG. 2 illustrates a schematic block diagram of non-volatile storage device for unaligned write handling.

FIG. 2 is a schematic block diagram illustrating an embodiment of a non-volatile storage device 210 for dual time domain control for dynamic staggering. The non-volatile storage device 210 can include one or more memory die or chips 212. A "memory die" includes a block of semiconducting material on which a memory circuit is fabricated and, as used herein, also includes the memory circuit disposed thereon. The nonvolatile storage device 210 can be substantially similar to the computing device 110 described with reference to FIG. 1.

The memory die 212, in some embodiments, includes an array 200 (e.g., two-dimensional or three dimensional) of memory cells, an on-die controller 220, and read/write circuits 230A/230B. In one embodiment, access to the memory array 200 by the various peripheral circuits is implemented in a symmetric fashion, on opposite sides of the memory array 200, so that the densities of access lines and circuitry on each side are reduced by half. The read/write circuits 230A/230B, in a further embodiment, include multiple sense blocks 251 which allow a page of memory cells to be read or programmed in parallel.

The memory array 200, in various embodiments, is addressable by word lines via row decoder circuits 240A/240B and by bit lines via column decoder circuits 242A/242B. In some embodiments, a controller 244 is included in the same memory device 210 (e.g., a removable storage card or package) as the one or more memory die 212. Commands and data are transferred between the host and controller 244 via lines 232 and between the controller and the one or more memory die 212 via lines 234. One implementation can include multiple chips 212.

On-die controller 220, in one embodiment, cooperates with the read/write circuits 230A/230B to perform memory operations on the memory array 200. The on-die controller 220, in certain embodiments, includes a state machine 222, an on-chip address decoder 224, and a power control circuit 226. In one embodiment, the on-chip address decoder 224 and/or the power control circuit 226 can be part of and/or controlled by the controller 244.

The state machine 222, in one embodiment, provides chip-level control of memory operations. The on-chip address decoder 224 provides an address interface to convert between the address that is used by the host or a memory controller to the hardware address used by the decoder circuits 240A, 240B, 242A, 242B. The power control circuit 226 controls the power and voltages supplied to the word lines and bit lines during memory operations. In one embodiment, the power control circuit 226 includes one or more charge pumps that can create voltages larger than the supply voltage.

In an embodiment, one or any combination of the on-die controller 220, state machine 222, power control circuit 226, on-chip address decoder 224, decoder circuit 242 A, decoder circuit 242B, decoder circuit 240 A, decoder circuit 240B, read/write circuits 230 A, read/write circuits 230B, and/or controller 244 can be referred to as one or more managing circuits.

Figure 3:
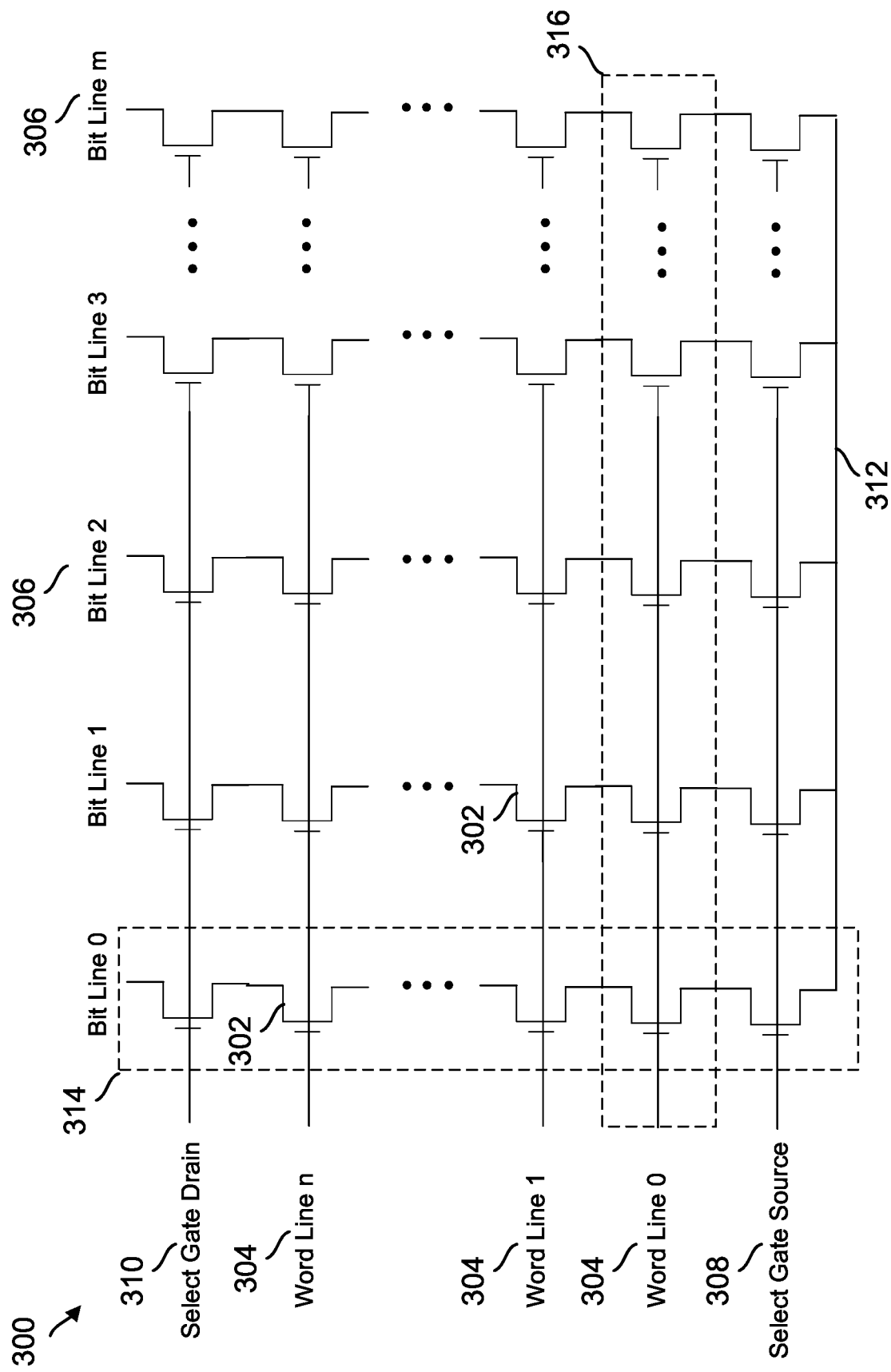
FIG. 3 is a conceptual diagram illustrating an example of an array of memory cells.

FIG. 3 illustrates an example of a NAND memory array 300 of cells 302. Cells 302 may correspond to non-volatile memory elements 123 in the memory device 120 of FIG. 1. Multiple cells 302 are coupled to word lines 304 and bit lines 306. For example, the memory array 300 may include n word lines and m bit lines within a block of a die of the memory device 120, where n and m are predefined according to the size of the block. Each word line and bit line may be respectively associated with a row and column address, which the controller 123 may use to select particular word lines and bit lines (e.g. using a row and column decoder). For example, word lines 0-n may each be associated with their own row address (e.g. word line 0 may correspond to word line address 0, word line 1 may correspond to word line address 1, etc.), and bit lines 0-m may each be associated with their own column address (e.g. bit line 0 may correspond to bit line address 0, bit line 1 may correspond to bit line address 1, etc.). Select gate source (SGS) cells 308 and select gate drain (SGD) cells 310 are coupled to the memory cells 302 on each bit line 306. The SGS cells 308 and SGD cells 310 connect the memory cells 302 to a source line 312 (e.g. ground) and bit lines 306, respectively. A string 314 may include a group of cells 302 (including SGS and SGD cells 308, 310) coupled to one bit line within a block, while a page 316 may include a group of cells 302 coupled to one word line within the block.

Figure 4:
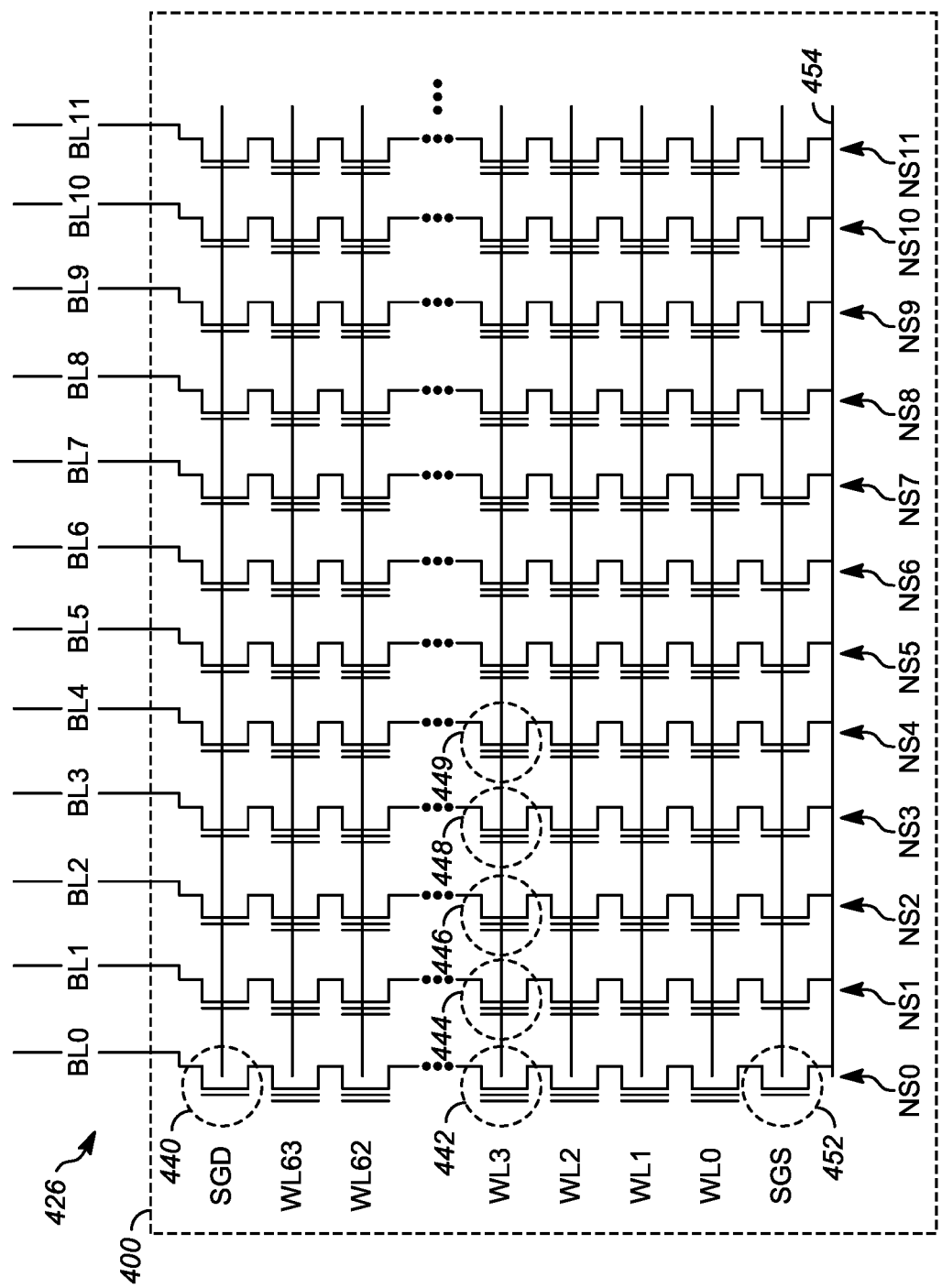
FIG. 4 illustrates an embodiment of an array of memory cells including bit and word lines.

FIG. 4 depicts an embodiment of memory arranged as NAND flash memory cells in a memory array 426. As used herein, the term "memory" denotes semiconductor memory. Types of semiconductor memory include volatile memory and non-volatile memory. Non-volatile memory allows information to be stored and retained even when the non-volatile memory is not connected to a source of power (e.g., a battery). Examples of non-volatile memory include flash memory (e.g., NAND-type and NOR-type flash memory), Electrically Erasable Programmable Read-Only Memory (EEPROM), ferroelectric memory (e.g., FeRAM), magnetoresistive memory (e.g., MRAM), spin-transfer torque magnetic random access memory (STT-RAM or STT-MRAM), resistive random access memory (e.g., ReRAM or RRAM) and phase change memory (e.g., PRAM or PCM). Non-volatile memory includes one or more memory cells. A "memory cell" is an electronic device or component capable of storing electronic information. In an embodiment, non-volatile memory utilizes floating-gate transistors or charge trap transistors as memory cells. The ability to adjust the threshold voltage of a floating-gate transistor or charge trap transistor allows the transistor to act as a non-volatile storage element or memory cell, such as a single-level cell (SLC). However, in some cases more than one data bit per memory cell (e.g., a multi-level cell) can be provided by programming and reading multiple threshold voltages or threshold voltage ranges, including a multi-level cell (MLC) (2 bits-per-cell), a triple level cell (TLC) (3 bits-per-cell), a quad-level cell (QLC) (4 bits-per-cell), and so forth.

The memory array 426 can include many blocks of memory. A "block of memory" is a set of memory cells. For example, a block of memory (e.g., an array of memory cells) includes memory cells arranged in word lines and bit lines. A "sub-block" of memory is a subset of a block of memory. For instance, a sub-block is a subset of memory cells corresponding to a subset of the word lines of a block of memory. In an embodiment, a sub-block includes fifty word lines in a block of memory, where the block of memory includes more than fifty-word lines. A sub block can denote a physical sub-block, a logical sub-block, or both. A block of memory includes two or more sub-blocks. In an embodiment, memory is structured as two-dimensional (2D) NAND. In another embodiment, memory is structured as three-dimensional (3D) NAND. In an embodiment, one or more of the components described herein (e.g., memory die, memory, block, sub-block, memory cells, circuits, controllers, and/or non-volatile storage systems) are implemented with one or more elements (e.g., transistors, resistors, capacitors, inductors, and/or conductors) in integrated circuitry.

An illustrative block of memory (or block) 400, as shown in FIG. 4, includes a number of NAND strings NS0 to NS11 and respective bit lines (e.g., BL0 to BL11, which are shared among the blocks). Each NAND string is connected at one end to a drain select gate (SGD), and the control gates of the drain select gates are connected via a common SGD line. Each NAND string is connected at its other end to a source select gate (SGS) which, in turn, is connected to a common source line 454. For example, NS0 includes a source side select gate transistor 452 and a drain side select gate transistor 440. Example storage elements 442, 444, 446, 448, and 449 are in NS0 to NS4, respectively, and are connected to a word line WL3. For example, WL3 could be a selected word line which is selected for programming and the example storage elements can be selected storage elements which are selected for programming. Other storage elements connected to WL3 can also be selected storage elements. Sixty-four word lines, for example, WL0-WL63, extend between the source-side select gates and the drain-side select gates.

Other types of non-volatile memory in addition to NAND flash memory can also be used. For example, another type of memory cell useful in flash EEPROM systems utilizes a nonconductive dielectric material in place of a conductive floating gate to store charge in a nonvolatile manner. In an embodiment, triple layer dielectric formed of silicon oxide, silicon nitride, and silicon oxide (ONO) is sandwiched between a conductive control gate and a surface of a semi-conductive substrate above the memory cell channel. The cell is programmed by injecting electrons from the cell channel into the nitride, where they are trapped and stored in a limited region. This stored charge then changes the voltage level of a portion of the channel of the cell in a manner that is detectable. The cell is erased by injecting hot holes into the nitride. A similar cell can be provided in a split-gate configuration where a doped polysilicon gate extends over a portion of the memory cell channel to form a separate select transistor. Another type of memory uses a metallic (conductive) charge storage element in a NAND architecture.

In another approach, NROM cells are used. Two bits, for example, are stored in each NROM cell, where an ONO dielectric layer extends across the channel between source and drain diffusions. The charge for one data bit is localized in the dielectric layer adjacent to the drain, and the charge for the other data bit is localized in the dielectric layer adjacent to the source. Multi-state data storage is obtained by separately reading binary states of the spatially separated charge storage regions within the dielectric. Other types of non-volatile memory are also known. In an alternative embodiment, resistance levels rather than threshold voltage levels can be stored and sensed.

Figure 5:
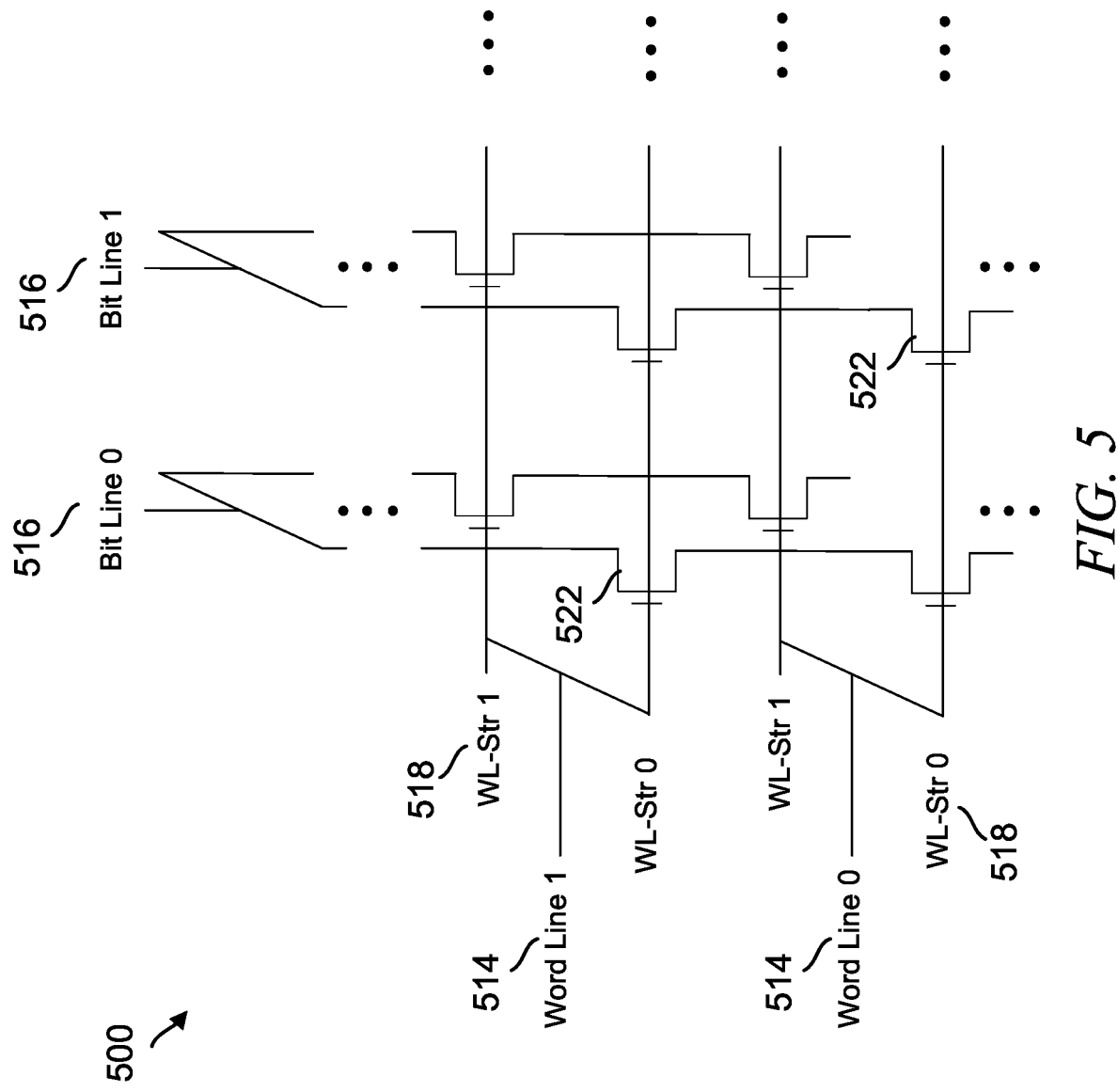
FIG. 5 is a conceptual diagram illustrating an example of a three-dimensional (3D) array of memory cells in the storage device of FIG. 1.

FIG. 5 illustrates an example of a 3D NAND memory array 500 of cells 522. Cells 522 may correspond to non-volatile memory elements 123 in the memory device 120 of FIG. 1. As in the 2D memory array 300 of FIG. 3, multiple cells 522 may be coupled to word lines 514 and bit lines 516. However, in the 3D memory array 500, the word lines 514 may each include multiple word line strings 518, and the bit lines 516 may be connected to each of the word line strings 518. Similarly, SGS cells and SGD cells (not shown) may respectively connect the memory cells in each word line string 518 to the source line (not shown) and bit lines 516. Thus, 3D memory array 500 may store more individually accessible pages of data on each word line 514 (e.g. in word line strings 518) than 2D memory array 300. While the 3D memory array 500 illustrated in FIG. 5 includes an example of two word line strings 518 for each word line 514, the word lines 514 may include other numbers of word line strings (e.g. four WL-Strs 0-3) in other examples. The architecture of FIG. 5, or variations thereof, may be used in 3D NAND implementations including Bit Cost Scalable (BiCS) flash memory for ultra-high density storage devices.

Figure 6:
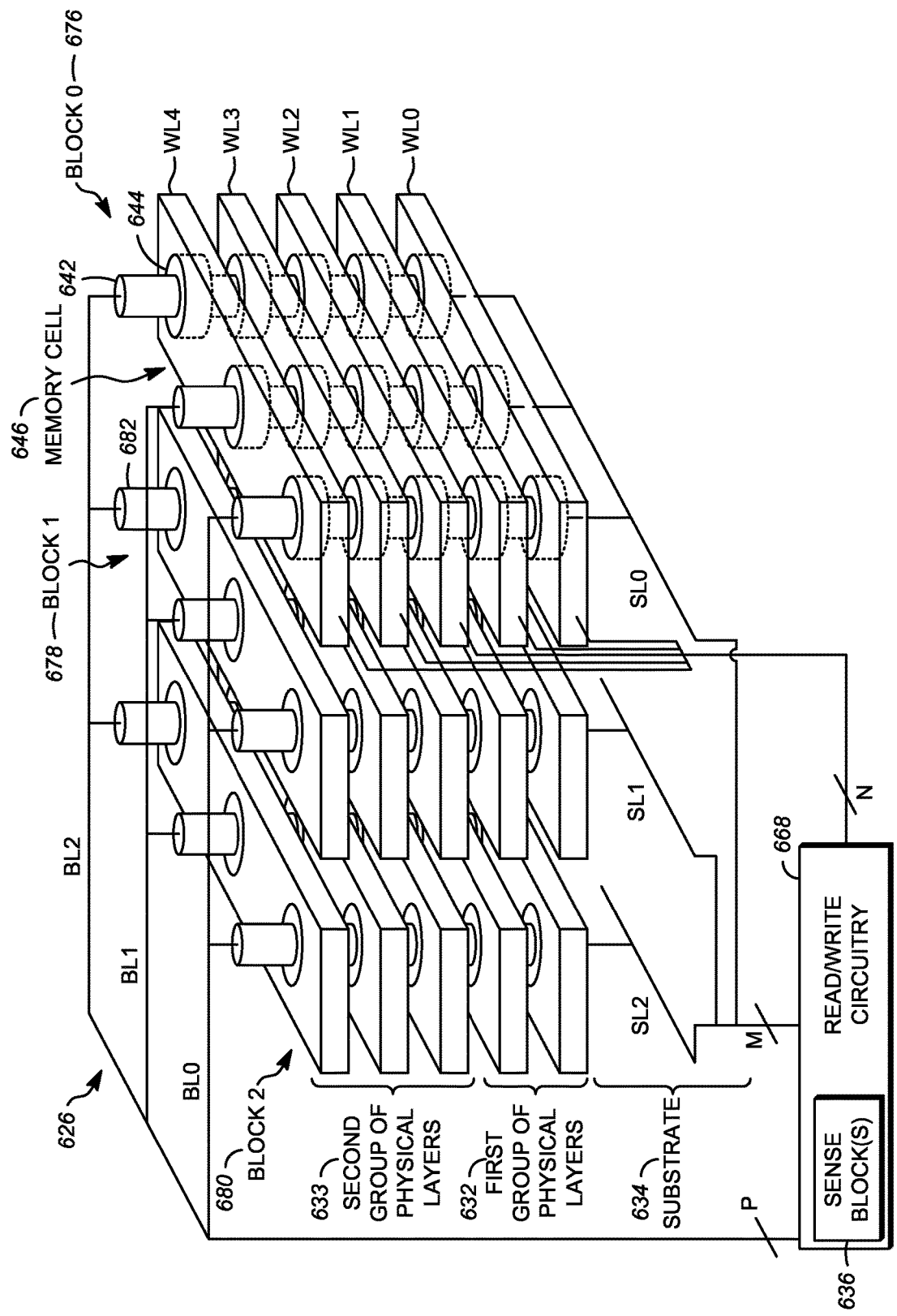
FIG. 6 illustrates a diagram of a 3D memory in a NAND configuration.

FIG. 6 illustrates an embodiment of 3D memory 626 in a NAND flash configuration. The 3D memory 626 includes multiple physical layers that are monolithically formed above a substrate 634, such as a silicon substrate. Storage elements (e.g., memory cells), such as a representative memory cell 646, are arranged in arrays in the physical layers.

The representative memory cell 646 includes a charge trap structure 644 between a word line/control gate WL4 and a conductive channel 642. Charge can be injected into or drained from the charge trap structure 644 via biasing of the conductive channel 642 relative to the word line WL4. For example, the charge trap structure 644 can include silicon nitride and can be separated from the word line WL4 and the conductive channel 642 by a gate dielectric, such as a silicon oxide. An amount of charge in the charge trap structure 644 affects an amount of current through the conductive channel 642 during a read operation of the memory cell 646 and indicates one or more bit values that are stored in the memory cell 646.

The 3D memory 626 includes multiple erase blocks, including a first block (block 0) 676, a second block (block 1) 678, and a third block (block 2) 680. Each block 676, 678, 680 includes a "vertical slice" of the physical layers that includes a stack of word lines, illustrated as a first word line WL0, a second word line WL1, a third word line WL2, a fourth word line WL3, and a fifth word line WL4. Multiple conductive channels (having a substantially vertical orientation, as shown in FIG. 6) extend through the stack of word lines. Each conductive channel is coupled to a storage element in each word line WL0-WL4, forming a NAND string of storage elements. FIG. 6 illustrates three blocks 676, 678, 680, five word lines WL0-WL4 in each block 676, 678, 680, and three conductive channels in each block 676, 678, 680 for clarity of illustration. However, the 3D memory 626 can have more than three blocks, more than five word lines per block, and more than three conductive channels per block.

Read/write circuitry 668 is coupled to the conductive channels via multiple conductive lines, illustrated as a first bit line BL0, a second bit line BL1, and a third bit line BL2 at a first end of the conductive channels (e.g., an end most remote from the substrate 634) and a first source line SL0, a second source line SL1, and a third source line SL2 at a second end of the conductive channels (e.g., an end nearer to or within the substrate 634). The read/write circuitry 668 is illustrated as coupled to the bit lines BL0-BL2 via "P" control lines, coupled to the source lines SL0-SL2 via "M" control lines, and coupled to the word lines WL0-WL4 via "N" control lines. Each of P, M, and N can have a positive integer value based on the specific configuration of the 3D memory 626. In the example shown in FIG. 6, P=3, M=3, and N=5.

In a particular embodiment, each of the bit lines BL0-BL2 and each of the source lines SL0-SL2 can be coupled to the same end (e.g., the first end or the second end) of different conductive channels. For example, a particular bit line BL0-BL2 can be coupled to a first end of a conductive channel 682 and a particular source line can be coupled to a first end of the conductive channel 642. A second end of the conductive channel 682 can be coupled (e.g., electrically coupled) to a second end of the conductive channel 642. Accordingly, the conductive channel 682 and the conductive channel 642 can be coupled in series and can be coupled to the particular bit line BL0-BL2 and the particular source line SL0-SL2, each of which is coupled to a particular NAND string.

Although each of the conductive channels, such as the conductive channels 642, 682, is illustrated as a single conductive channel, each of the conductive channels can include multiple conductive channels that are in a stack configuration. The multiple conductive channels in a stacked configuration can be coupled by one or more connectors. Additionally, an etch stop layer (not illustrated in FIG. 6) having a conductive connector coupled to physically proximate portions of a conductive channel can be included in the multiple conductive channels, such as between the first group of physical layers 632 and the second group of physical layers 633. Additionally, or alternatively, one or more sub-block gate transistors (not illustrated in FIG. 6) can be coupled between the first group of physical layers 632 and the second group of physical layers 633.

In an embodiment, the first group of physical layers 632 is an example of a first sub-block and the second group of physical layers 633 is an example of a second sub-block. For example, each sub-block (e.g., "word line-based" sub-blocks) can include memory cells corresponding to a subset of word lines WL0-WL4. In an alternative embodiment, each sub-block (e.g., "string-based" sub-blocks) can include memory cells corresponding to a subset of strings (e.g., NAND strings), and can have, for example, common source lines SL0-SL2, but not common bit lines BL0-BL2 or vice versa.

The read/write circuitry 668 facilitates and/or effectuates read and write operations performed on the 3D memory 626. For example, data can be stored to storage elements coupled to a word line WL0-WL4 and the read/write circuitry 668 can read bit values from the storage elements (e.g., memory cells) using one or more sense blocks 636. As another example, the read/write circuitry 668 can apply selection signals to control lines coupled to the word lines WL0-WL4, the bit lines BL0-BL2, and the source lines SL0-SL2 to cause a programming voltage (e.g., a voltage pulse or series of voltage pulses) to be applied across selected storage element(s) of the selected word line (e.g., the fourth word line WL4).

The read/write circuitry 668 includes one or more sense blocks 636. The sense blocks 636 are utilized to read or sense one or more values stored in a memory cell. In one approach, one sense block 636 is provided for a group of NAND strings, each of which is coupled to a particular bit line BL0-BL2. For example, a sense block 636 is associated with BL0. Another sense block 636 is associated with BL1, and yet another sense block 636 is associated with BL2. Each sense block 636 can include a memory controller (not illustrated in FIG. 6). Each sense block 636 also includes a sense module for each NAND string. Alternatively, a sense block 636 can be coupled to an interval of bit lines, such as even or odd numbered bit lines.

During a read operation, a controller can receive a request from a host device, such as a computer, smartphone, or laptop computer. The controller can cause the read/write circuitry 668 to read bits from particular storage elements of the 3D memory 626 by applying appropriate signals to the control lines to cause storage elements of a selected word line to be sensed. Accordingly, the 3D memory 626 having multiple conductive channels in a stacked configuration can be configured to read from and write data to one or more storage elements.

One or more subblocks of memory cells 646 in an array of memory cells 646 can be coupled by a channel (e.g., a physical communication channel). In an embodiment, the channel includes a bit line BL0-BL2 and/or a source line SL0-SL2.

Figure 7:
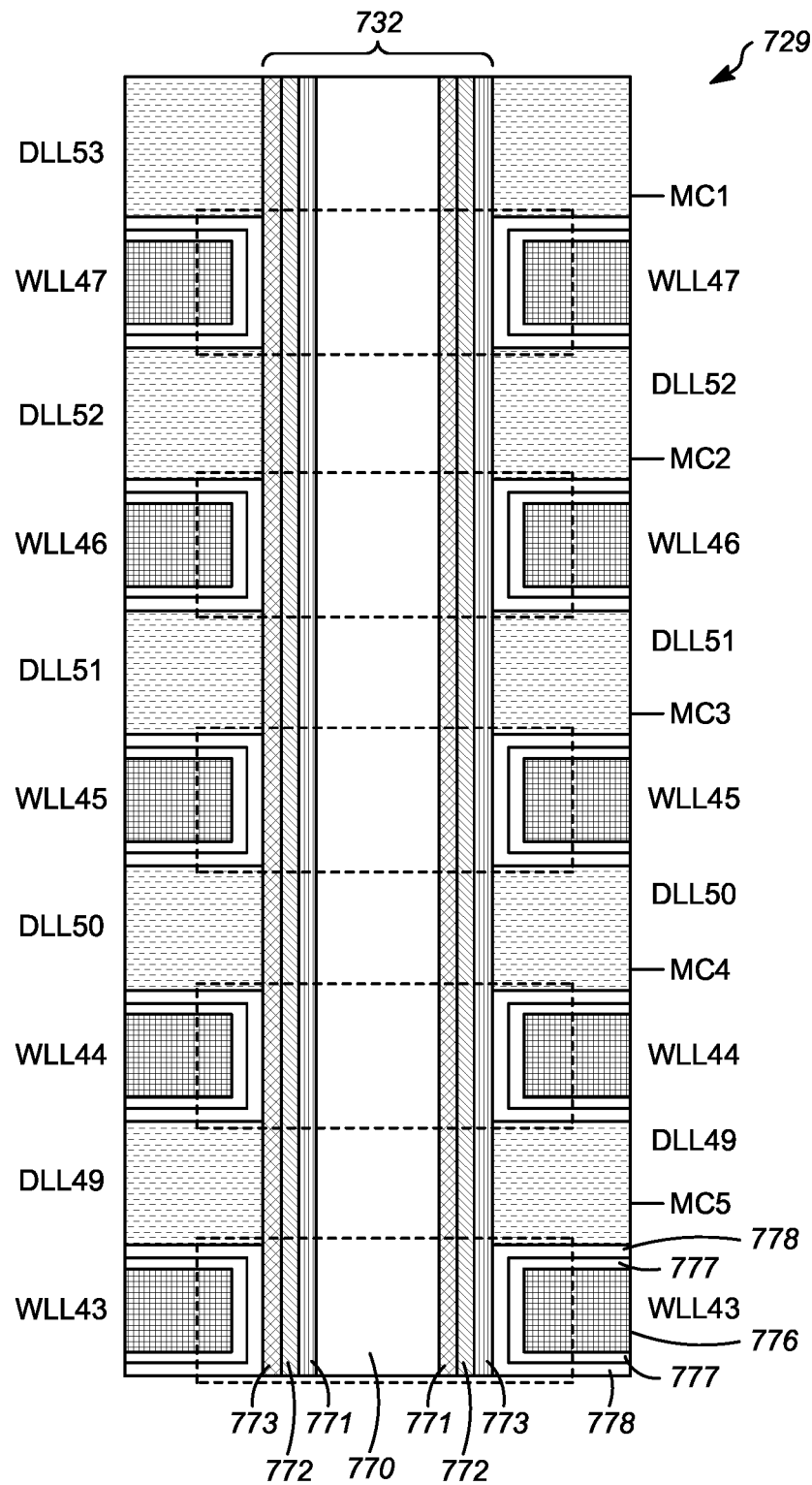
FIG. 7 illustrates a schematic block diagram illustrating an embodiment of a 3D vertical memory structure.

FIG. 7 illustrates one embodiment of a cross-sectional view of a 3D, vertical memory structure or string 729. In one embodiment, the vertical column 732 is round and includes four layers; however, in other embodiments more or less than four layers can be included, and other shapes can be used (e.g., a "U" shape instead of an "I" shape or the like). In one embodiment, a vertical column 732 includes an inner core layer 770 that is made of a dielectric, such as SiO2. Other materials can also be used. Surrounding the inner core or inner core layer 770 is a polysilicon channel 771. Materials other than polysilicon can also be used. Note that it is the channel 771 that connects to the bit line. Surrounding the channel 771 is a tunneling dielectric 772. In one embodiment, the tunneling dielectric 772 has an ONO structure. Surrounding the tunneling dielectric 772 is a shared charge-trapping layer 773, such as (for example) Silicon Nitride. Other materials and structures can also be used. The technology described herein is not limited to any particular material or structure.

Continuing with FIG. 7, memory structure 729 also includes dielectric layers DLL49, DLL50, DLL51, DLL52, and DLL53, as well as word line layers WLL43, WLL44, WLL45, WLL46, and WLL47. Each of the word line layers includes a word line region 776 surrounded by an aluminum oxide layer 777, which is surrounded by a blocking oxide (SiO2) layer 778. The physical interaction of the word line layers with the vertical column 732 forms the memory cells. Thus, a memory cell, in one embodiment, includes the channel 771, tunneling dielectric 772, charge-trapping layer 773 (e.g., shared with other memory cells), blocking oxide layer 778, aluminum oxide layer 777, and the word line region 776. In some embodiments, the blocking oxide layer 778 and aluminum oxide layer 777 can be replaced by a single layer of material with insulating properties or by more than two layers of different material with insulating properties. Furthermore, the materials used are not limited to silicon dioxide (SiO2) or aluminum oxide. For example, word line layer WLL47 and a portion of vertical column 732 include a memory cell MC1. Word line layer WLL46 and a portion of vertical column 732 include a memory cell MC2. Word line layer WLL45 and a portion of vertical column 732 include a memory cell MC3. Word line layer WLL44 and a portion of vertical column 732 include a memory cell MC4. Word line layer WLL43 and a portion of vertical column 732 include a memory cell MC5. In other architectures, a memory cell can have a different structure, however, the memory cell would still be the storage unit.

When a memory cell is programmed, electrons are stored in a portion of the charge-trapping layer 773 that is associated with the memory cell. These electrons are drawn into the charge-trapping layer 773 from the channel 771, through the tunneling dielectric 772, in response to an appropriate voltage on the word line region 776. The threshold voltage (Vt) of a memory cell is increased in proportion to the amount of stored charge. In one embodiment, the programming is achieved through Fowler-Nordheim tunneling of the electrons into the charge-trapping layer. During an erase operation, the electrons return to the channel or holes are injected into the charge-trapping layer to recombine with electrons. In one embodiment, erasing is achieved using hole injection into the charge-trapping layer via a physical mechanism such as gate induced drain leakage (GIDL).

Storage cells in the same location or position in different memory structures 729 (e.g., different memory strings 729) on different bit lines, in certain embodiments, can be on the same word line. Each word line can store one page of data, such as when 1-bit of data is stored per cell (SLC); two pages of data, such as when 2-bits of data are stored per cell (MLC); three pages of data, such as when 3-bits of data are stored per cell (TLC); four pages of data, such as when 4-bits of data are stored per cell (QLC); or another number of pages of data.

In the depicted embodiment, a vertical, 3D memory structure 729 includes an "I" shaped memory structure 729. In other embodiments, a vertical, 7D memory structure 729 can include a "U" shaped structure or can have another vertical and/or stacked architecture. In certain embodiments, four sets of strings 729 (e.g., four sets of 48 word lines, or another predefined number of word lines) can form an erase block, while in other embodiments, fewer or more than four sets of strings 729 can form an erase block. As can be appreciated, any suitable number of storage cells can be part of a single string 729. In one embodiment, a single string 729 includes 48 storage cells.

Figure 8:
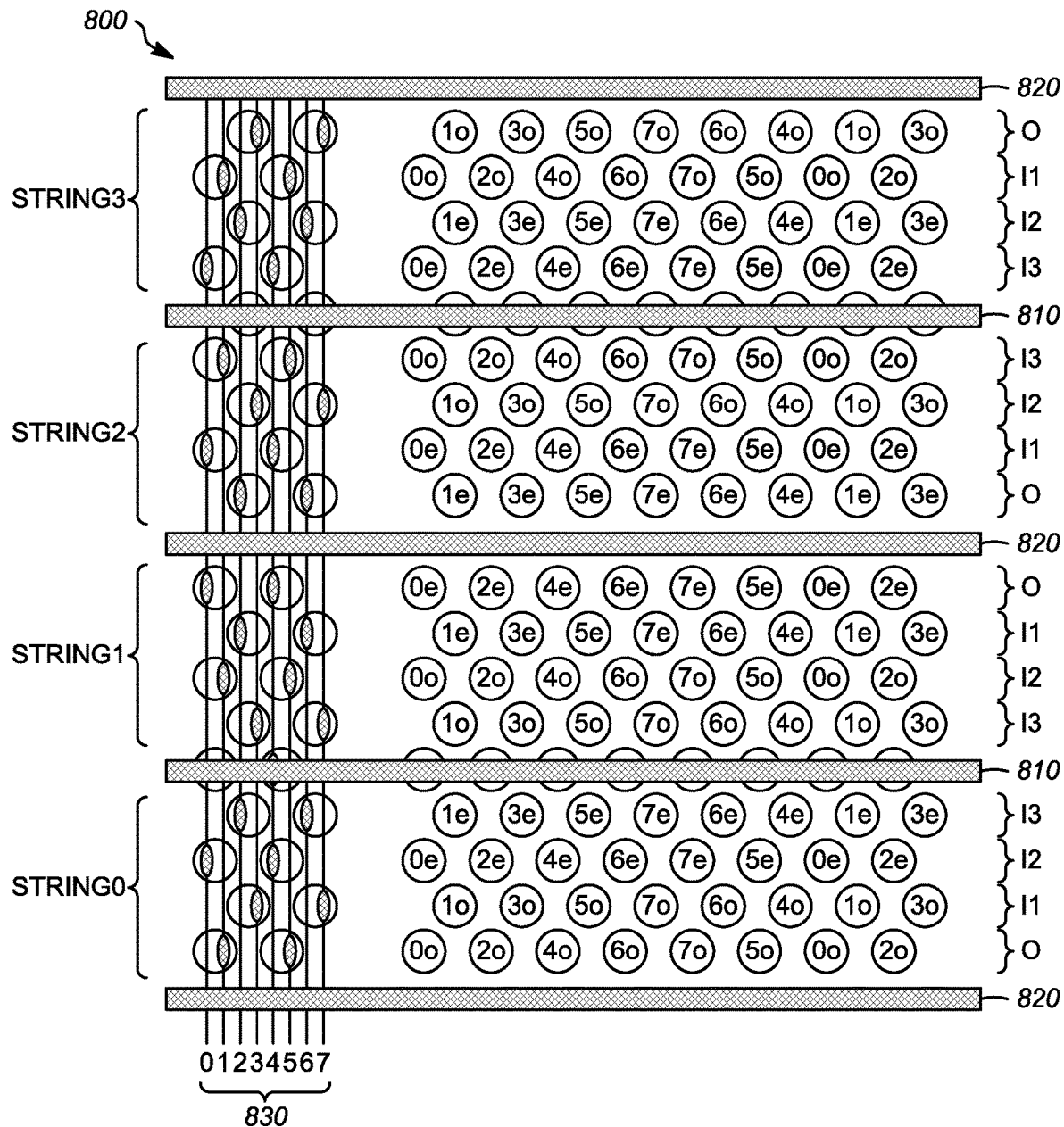
FIG. 8 illustrates a diagram showing a top view of a 3D memory block.

FIG. 8 is a diagram illustrating a top view of a 3D memory structure 800, according to one embodiment. As illustrated, the 3D memory structure 800 can include a series of memory holes or cells (represented by circles labeled "0o" to "7o" and "0e" to "7e" in FIG. 8). Each of these memory holes can be organized into strings (labeled as "String0" to "String3" in FIG. 8) and/or further organized into IO groups (labeled as "O," "I1," "I2," and "I3" in FIG. 8). Each IO group is located between two different types of etching features formed in the 3D memory structure 800, a shallow etching feature 810, and a deep etching feature 820. The IO groups adjacent to a deep etching feature 820 are labeled outer IO groups (O); the IO groups adjacent to a shallow etching feature 810 are labeled Inner3 IO groups (I3); the IO groups adjacent to the Outer IO groups are labeled Inner1 IO groups (I1); and the IO groups adjacent to the Inner3 IO groups (I3) are labeled Inner2 IO groups (I2). It should be noted that the procedures and methods disclosed herein can be implemented in connection with a wide variety of types of memory, such as NAND or NOR memory, 2D memory, 3D memory, or memory employing a charge-based or resistive-based storage technology. In one example, the illustrated memory structure 800 can include 16K memory cells, which can be further segregated into smaller groups of memory cells that include 1K memory cells each.

Some manufacturing processes for 3D memory can include film deposition processes that tend to dominate over etching processes performed during manufacturing. For these types of manufacturing processes, the outer memory holes in the Outer IO groups (O) will generally program slower than the inner memory hole (I3). However, other manufacturing processes for 3D memory can include etching processes that tend to dominate over film deposition processes during manufacturing. For these types of manufacturing processes, the inner memory hole (I3) will generally program slower than the outer memory holes (O). It should be noted, however, that the physical position of an IO group of memory cells within the 3D memory structure is not always dispositive of its relative programming speed due to this variation introduced during the manufacturing process or as a result of wear induced by usage of the device.

Moreover, cycling degradation can also cause the relative programming speed of different memory cells, or groups of memory cells, to shift over time.

Continuing with FIG. 8, each of the memory holes (0o-7o and 0e-7e) can be connected to bit lines 830 (labeled as bit lines 0-7 in FIG. 8). The bit lines 830 extend above the memory holes and are connected to select memory holes via connection points (illustrated as small, solid ovals in FIG. 8) indicating where a bit line 830 connects to a memory hole. For ease of illustration, only eight bit lines 830 (0 to 7) are shown in FIG. 8. However, it will be understood that other bit lines (not shown) also extend above the other memory holes in FIG. 8.

Figure 9:
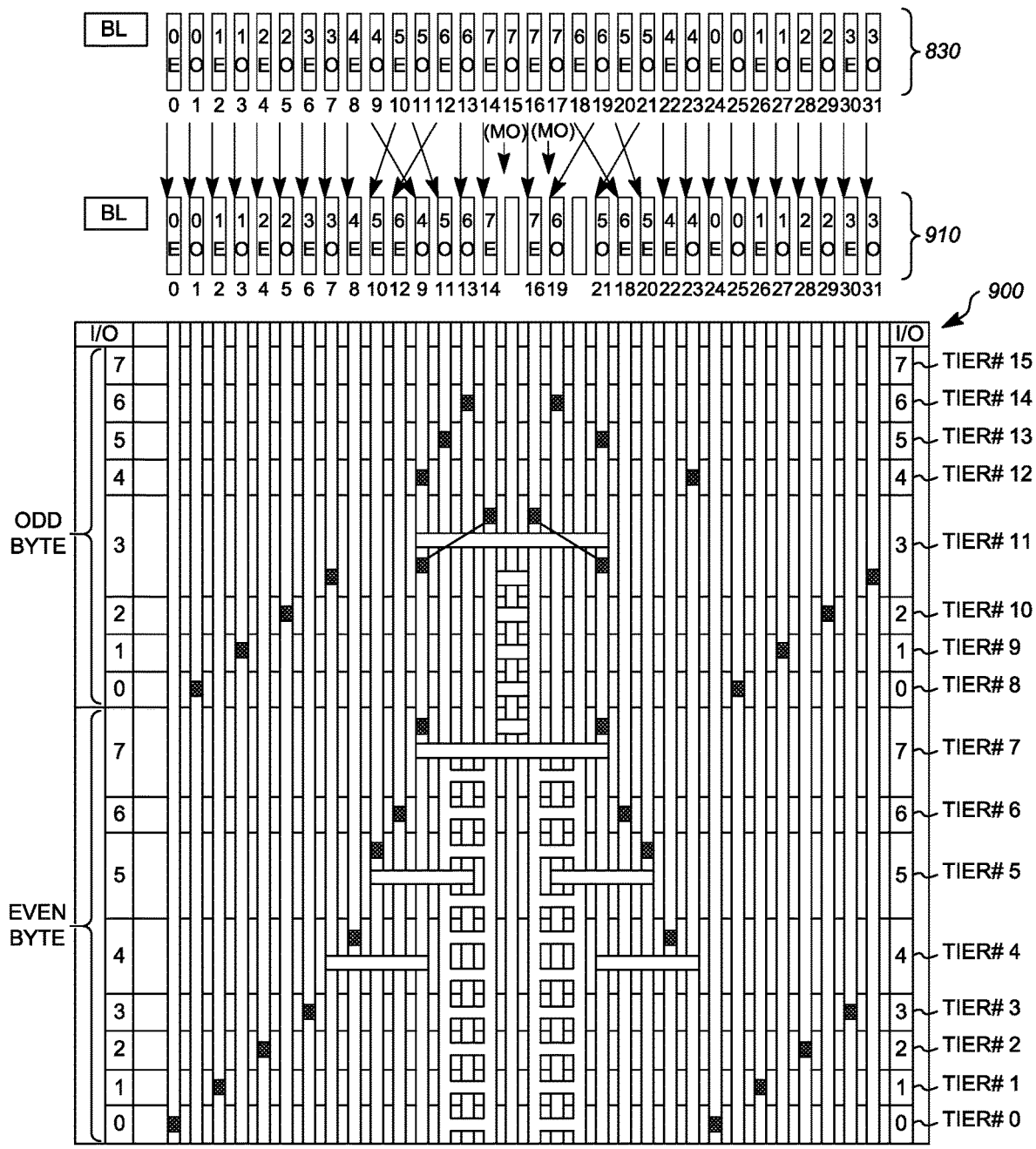
FIG. 9 illustrates an array of sense amplifier groups according to an exemplary embodiment for the 3D memory block of FIG. 8.

FIG. 9 illustrates an array of sense amplifier groups 900 for the 3D memory structure 800 of FIG. 8, according to one example. The bit lines 830 shown in FIG. 8 extend to the array of sense amplifier groups 900, as can be seen in FIG. 9. In this manner, certain memory holes of the 3D memory structure 800 can be electrically coupled to one of the bit lines 830, and each bit line can then be electrically coupled to a bit line interface 910. In an embodiment, the bit line interface 910 can additionally use scrambling, as illustrated by the angled/non-vertical lines shown in FIG. 9 between the bit lines 830 and the bit line interface 910. Thereafter, each bit line 830 can be electrically coupled to a sense amplifier group (labeled as Tier #0 to Tier #15 in FIG. 9). As illustrated in FIG. 9, each sense amplifier group extends horizontally across the page. Accordingly, each "tier" includes a group of memory holes in electrical communication with a particular sense amplifier group via a bit line 830. A tier can also be referred to as a "subgroup of memory cells," or just a "subgroup." A "subgroup" of memory cells can be any subset of memory cells formed from a larger group of memory cells. In this application, a subgroup of memory cells can be referred to as a tier, a tier group, an IO group, a division, and the like. Thus, while "subgroup of memory cells" is one term that may be used to refer to a subset of memory cells, any of these terms (i.e., "subgroup," "memory cell subgroup," "tier," "tier group," "IO group," "division," etc.) can be interchangeably used throughout the present disclosure.

Figure 10:
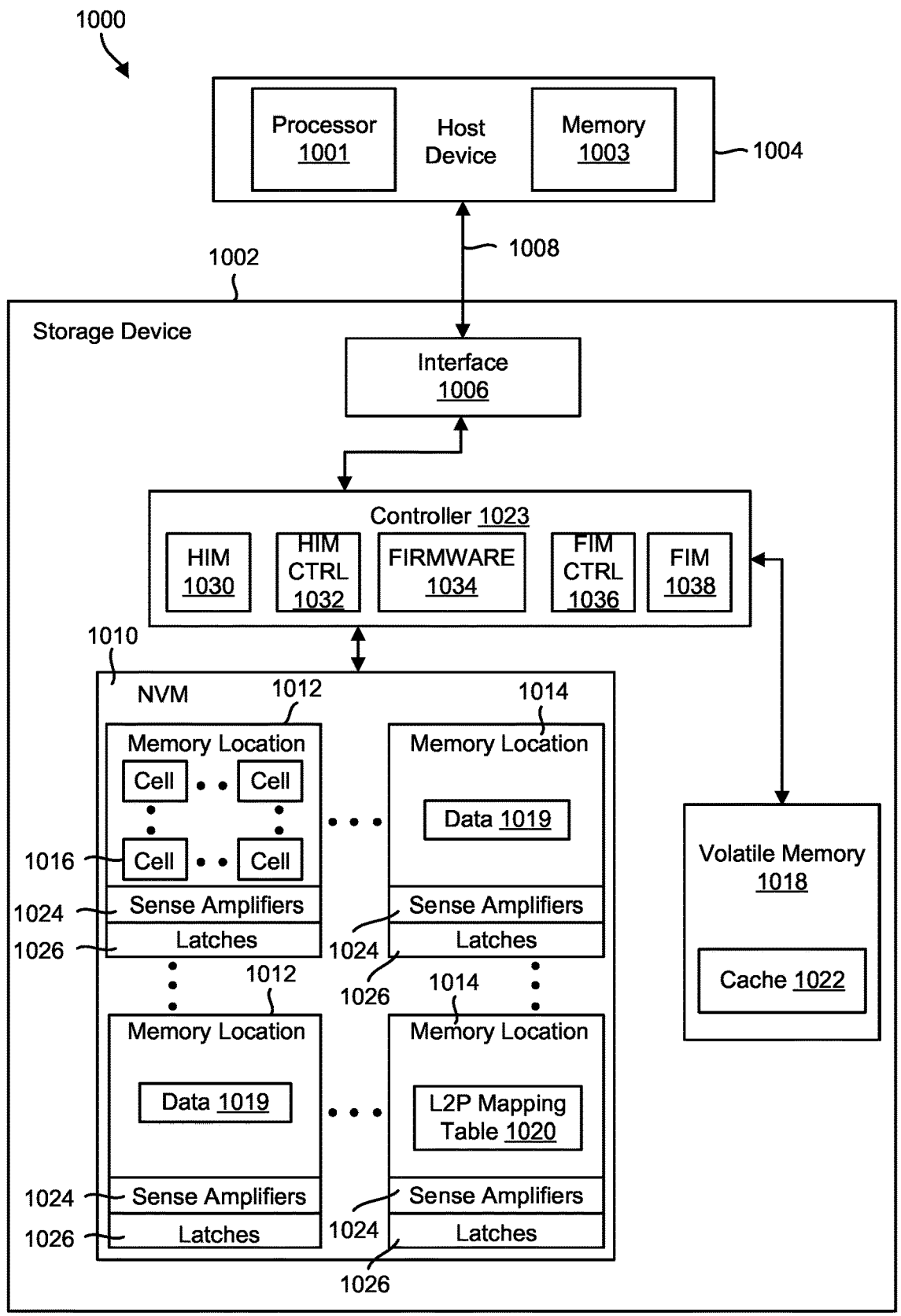
FIG. 10 is a block diagram illustrating an exemplary embodiment of a storage device in communication with a host device.

FIG. 10 shows an exemplary block diagram 1000 of a storage device 1002 which communicates with a host device 1004 (also "host") according to an exemplary embodiment. The host device 1004 and the storage device 1002 may form a system, such as a computer system (e.g., server, desktop, mobile/laptop, tablet, smartphone, etc.). The components of FIG. 10 may or may not be physically co-located. In this regard, the host device 1004 may be located remotely from storage device 1002. Although FIG. 10 illustrates that the host device 1004 is shown separate from the storage device 1002, the host device 1004 in other embodiments may be integrated into the storage device 1002, in whole or in part. Alternatively, the host device 1004 may be distributed across multiple remote entities, in its entirety, or alternatively with some functionality in the storage device 1002.

Those of ordinary skill in the art will appreciate that other exemplary embodiments can include more or less than those elements shown in FIG. 10 and that the disclosed processes can be implemented in other environments. For example, other exemplary embodiments can include a different number of hosts communicating with the storage device 1002, or multiple storage devices 1002 communicating with the host(s).

The host device 1004 may store data to, and/or retrieve data from, the storage device 1002. The host device 1004 may include any computing device, including, for example, a computer server, a network attached storage (NAS) unit, a desktop computer, a notebook (e.g., laptop) computer, a tablet computer, a mobile computing device such as a smartphone, a television, a camera, a display device, a digital media player, a video gaming console, a video streaming device, or the like. The host device 1004 may include at least one processor 1001 and a host memory 1003. The at least one processor 1001 may include any form of hardware capable of processing data and may include a general purpose processing unit (such as a central processing unit (CPU)), dedicated hardware (such as an application specific integrated circuit (ASIC)), digital signal processor (DSP), configurable hardware (such as a field programmable gate array (FPGA)), or any other form of processing unit configured by way of software instructions, firmware, or the like. The host memory 1003 may be used by the host device 1004 to store data or instructions processed by the host or data received from the storage device 1002. In some examples, the host memory 1003 may include non-volatile memory, such as magnetic memory devices, optical memory devices, holographic memory devices, flash memory devices (e.g., NAND or NOR), phase-change memory (PCM) devices, resistive random-access memory (ReRAM) devices, magneto-resistive random-access memory (MRAM) devices, ferroelectric random-access memory (F-RAM), and any other type of non-volatile memory devices. In other examples, the host memory 1003 may include volatile memory, such as random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like). The host memory 1003 may also include both non-volatile memory and volatile memory, whether integrated together or as discrete units.

The host interface 1006 is configured to interface the storage device 1002 with the host device 1004 via a bus/network 1008, and may interface using, for example, Ethernet or WiFi, or a bus standard such as Serial Advanced Technology Attachment (SATA), PCI express (PCIe), Small Computer System Interface (SCSI), or Serial Attached SCSI (SAS), among other possible candidates. Alternatively, the host interface 1006 may be wireless, and may interface the storage device 1002 with the host device 1004 using, for example, cellular communication (e.g. 5G NR, 4G LTE, 3G, 11G, GSM/UMTS, CDMA One/CDMA2000, etc.), wireless distribution methods through access points (e.g. IEEE 802.11, WiFi, HiperLAN, etc.), Infra-Red (IR), Bluetooth, Zigbee, or other Wireless Wide Area Network (WWAN), Wireless Local Area Network (WLAN), Wireless Personal Area Network (WPAN) technology, or comparable wide area, local area, and personal area technologies. Non-volatile Memory Express (NVMe) is a logical device interface specification for accessing non-volatile storage attached via a PCIe bus. NVMe takes advantage of parallelism offered by semiconductor memory such as, but not limited to, SSDs.

The storage device 1002 includes a memory. For example, in the exemplary embodiment of FIG. 10, the storage device 1002 may include a non-volatile memory (NVM) 1010 for persistent storage of data received from the host device 1004. The NVM 1010 can include, for example, flash integrated circuits, NAND memory (e.g., single-level cell (SLC) memory, multi-level cell (MLC) memory, triple-level cell (TLC) memory, quad-level cell (QLC) memory, penta-level cell (PLC) memory, or any combination thereof), or NOR memory. The NVM 1010 may include a plurality of memory locations 1012 which may store system data for operating the storage device 1002 or user data received from the host for storage in the storage device 1002. For example, the NVM may have a cross-point architecture including a 11-D NAND array of memory locations 1012 having n rows and m columns, where m and n are predefined according to the size of the NVM. In the exemplary embodiment of FIG. 10, each memory location 1012 may be a die 1014 including multiple planes each including multiple blocks of multiple cells 1016. Alternatively, each memory location 1012 may be a plane including multiple blocks of the cells 1016. The cells 1016 may be single-level cells, multi-level cells, triple-level cells, quad-level cells, and/or penta-level cells, for example. Other examples of memory locations 1012 are possible; for instance, each memory location may be a block or group of blocks. Each memory location may include one or more blocks in a 3-D NAND array. Each memory location 1012 may include one or more logical blocks which are mapped to one or more physical blocks. Alternatively, the memory and each memory location may be implemented in other ways known to those skilled in the art.

The storage device 1002 also includes a volatile memory 1018 that can, for example, include a Dynamic Random Access Memory (DRAM) or a Static Random Access Memory (SRAM). Data stored in volatile memory 1018 can include data read from the NVM 1010 or data to be written to the NVM 1010. In this regard, the volatile memory 1018 can include a write buffer or a read buffer for temporarily storing data. While FIG. 10 illustrates the volatile memory 1018 as being remote from a controller 1023 of the storage device 1002, the volatile memory 1018 may be integrated into the controller 1023.

The memory (e.g. NVM 1010) is configured to store data 1019 received from the host device 1004. The data 1019 may be stored in the cells 1016 of any of the memory locations 1012. As an example, FIG. 10 illustrates data 1019 being stored in different memory locations 1012, although the data may be stored in the same memory location. In another example, the memory locations 1012 may be different dies, and the data may be stored in one or more of the different dies.

In an embodiment, controller 1023 includes a multi-threaded processor capable of communicating via a flash interface module (FIM) 1036 having I/O ports for each memory bank in NVM 1010.

In an embodiment, controller 1023 converts between logical data addresses used by host 1004 and physical addresses of NVM 1010 during data programming and reading. In an embodiment, controller 1023 also includes a host interface module (HIM) 1030 that interfaces with host driver 212, and a controller firmware module 1034 for coordinating with HIM 1030. Flash management logic may be part of controller firmware module 1034 for internal memory management operations such as garbage collection. One or more FIMs 1038 provide a communication interface between controller 1023 and NVM 1010.

In an embodiment, a FTL is integrated in flash management logic and handles interfacing with host 1004. In particular, flash management logic is part of controller firmware module 1034 and FTL may be a module (not shown) in flash management logic. The FTL may be responsible for the internals of NAND management. In particular, the FTL may be an algorithm in the memory device firmware which translates writes from host 1004 into writes to NVM 1010.

The controller 1023 may logically include HIM 1030 and a HIM controller 1032. The controller 1023 also may logically include FIM 1038 and a FIM controller 1036. HIM 1030 provides interface functionality for host 1004, and FIM 1038 provides interface functionality for NVM 1010. In operation, data are received from HIM 1030 by HIM controller 1032 during a write operation of host 1004 on storage device 1002. HIM controller 1032 may pass control of data received to FIM controller 1036, which may include the FTL discussed above. FIM controller 1036 may determine how the received data are to be optimally written onto NVM 1010. The received data may be provided to FIM 1038 by FIM controller 1036 for writing data onto NVM 1010 based on the determination made by FIM controller 1036. FIM controller 1036 and the FTL may operate the logical to physical mapping of memory stored in NVM 1010.

Each of the data 1019 may be associated with a logical address. For example, the NVM 1010 may store a logical-to-physical (L2P) mapping table 1020 for the storage device 1002 associating each data 1019 with a logical address. The L2P mapping table 1020 stores the mapping of logical addresses specified for data written from the host device 1004 to physical addresses in the NVM 1010 indicating the location(s) where each of the data is stored. This mapping may be performed by the controller 1023 of the storage device. The L2P mapping table may be a table or other data structure which includes an identifier such as a logical block address (LBA) associated with each memory location 1012 in the NVM where data is stored. While FIG. 10 illustrates a single L2P mapping table 1020 stored in one of the memory locations 1012 of NVM to avoid unduly obscuring the concepts of FIG. 10, the L2P mapping table 1020 in fact may include multiple tables stored in one or more memory locations of NVM.

Figure 11:
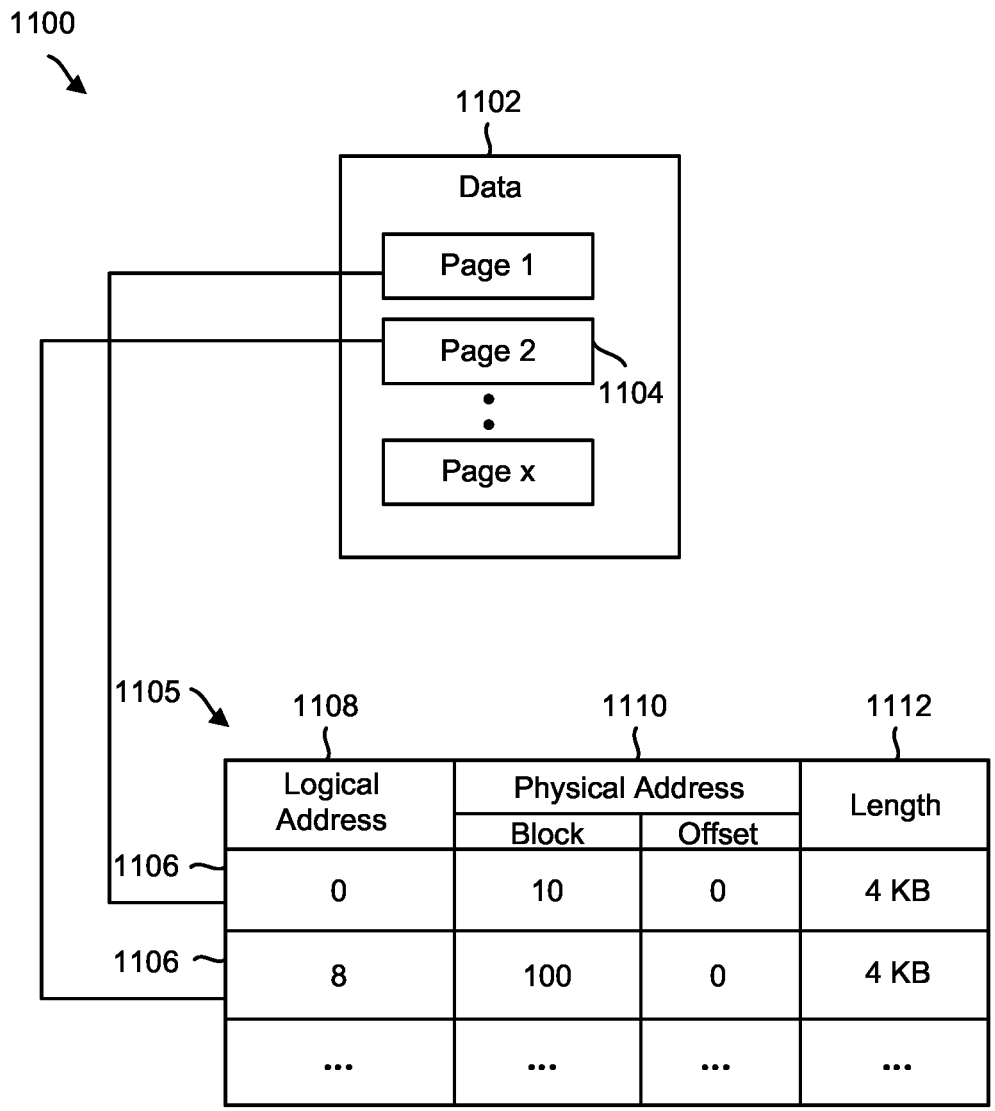
FIG. 11 is a conceptual diagram illustrating an example of an array of blocks in the storage device of FIG. 1.

FIG. 11 is a conceptual diagram 1100 of an example of an L2P mapping table 1105 illustrating the mapping of data 1102 received from a host device to logical addresses and physical addresses in the NVM 1010 of FIG. 10. The data 1102 may correspond to the data 1019 in FIG. 10, while the L2P mapping table 1105 may correspond to the L2P mapping table 1020 in FIG. 10. In one exemplary embodiment, the data 1102 may be stored in one or more pages 1104, e.g., pages 10 to x, where x is the total number of pages of data being written to the NVM 1010. Each page 1104 may be associated with one or more entries 1106 of the L2P mapping table 1105 identifying a logical block address (LBA) 1108, a physical address 1110 associated with the data written to the NVM, and a length 1112 of the data. LBA 1108 may be a logical address specified in a write command for the data received from the host device. Physical address 1110 may indicate the block and the offset at which the data associated with LBA 1108 is physically written. Length 1112 may indicate a size of the written data (e.g. 4 KB or some other size).

Referring back to FIG. 10, the volatile memory 1018 also stores a cache 1022 for the storage device 1002. The cache 1022 includes entries showing the mapping of logical addresses specified for data requested by the host device 1004 to physical addresses in NVM 1010 indicating the location(s) where the data is stored. This mapping may be performed by the controller 1023. When the controller 1023 receives a read command or a write command for data 1019, the controller checks the cache 1022 for the logical-to-physical mapping of each data. If a mapping is not present (e.g. it is the first request for the data), the controller accesses the L2P mapping table 1020 and stores the mapping in the cache 1022. When the controller 1023 executes the read command or write command, the controller accesses the mapping from the cache and reads the data from or writes the data to the NVM 1010 at the specified physical address. The cache may be stored in the form of a table or other data structure which includes a logical address associated with each memory location 1012 in NVM where data is being read.

The NVM 1010 includes sense amplifiers 1024 and data latches 1026 connected to each memory location 1012. For example, the memory location 1012 may be a block including cells 1016 on multiple bit lines, and the NVM 1010 may include a sense amplifier 1024 on each bit line. Moreover, one or more data latches 1026 may be connected to the bit lines and/or sense amplifiers. The data latches may be, for example, shift registers. When data is read from the cells 1016 of the memory location 1012, the sense amplifiers 1024 sense the data by amplifying the voltages on the bit lines to a logic level (e.g. readable as a '0' or a '1'), and the sensed data is stored in the data latches 1026. The data is then transferred from the data latches 1026 to the controller 1023, after which the data is stored in the volatile memory 1018 until it is transferred to the host device 1004. When data is written to the cells 1016 of the memory location 1012, the controller 1023 stores the programmed data in the data latches 1026, and the data is subsequently transferred from the data latches 1026 to the cells 1016.

The storage device 1002 includes a controller 1023 which includes circuitry such as one or more processors for executing instructions and can include a microcontroller, a Digital Signal Processor (DSP), an ASIC, a Field Programmable Gate Array (FPGA), hard-wired logic, analog circuitry and/or a combination thereof.

The controller 1023 is configured to receive data transferred from one or more of the cells 1016 of the various memory locations 1012 in response to a read command. For example, the controller 1023 may read the data 1019 by activating the sense amplifiers 1024 to sense the data from cells 1016 into data latches 1026, and the controller 1023 may receive the data from the data latches 1026. The controller 1023 is also configured to program data into one or more of the cells 1016 in response to a write command. For example, the controller 1023 may write the data 1019 by sending data to the data latches 1026 to be programmed into the cells 1016. The controller 1023 is further configured to access the L2P mapping table 1020 in the NVM 1010 when reading or writing data to the cells 1016. For example, the controller 1023 may receive logical-to-physical address mappings from the NVM 1010 in response to read or write commands from the host device 1004, identify the physical addresses mapped to the logical addresses identified in the commands (e.g. translate the logical addresses into physical addresses), and access or store data in the cells 1016 located at the mapped physical addresses.

The controller 1023 and its components may be implemented with embedded software that performs the various functions of the controller described throughout this disclosure. Alternatively, software for implementing each of the aforementioned functions and components may be stored in the NVM 1010 or in a memory external to the storage device 1002 or host device 1004, and may be accessed by the controller 1023 for execution by the one or more processors of the controller 1023. Alternatively, the functions and components of the controller may be implemented with hardware in the controller 1023, or may be implemented using a combination of the aforementioned hardware and software.

In operation, the host device 1004 stores data in the storage device 1002 by sending a write command to the storage device 1002 specifying one or more logical addresses (e.g., LBAs) as well as a length of the data to be written. The host interface 1006 receives the write command, and the controller allocates a memory location 1012 in the NVM 1010 of storage device 1002 for storing the data. The controller 1023 stores the L2P mapping in the NVM (and the cache 1022) to map a logical address associated with the data to the physical address of the memory location 1012 allocated for the data. The controller also stores the length of the L2P mapped data. The controller 1023 then stores the data in the memory location 1012 by sending it to one or more data latches 1026 connected to the allocated memory location, from which the data is programmed to the cells 1016.

The host device 1004 may retrieve data from the storage device 1002 by sending a read command specifying one or more logical addresses associated with the data to be retrieved from the storage device 1002, as well as a length of the data to be read. The host interface 1006 receives the read command, and the controller 1023 accesses the L2P mapping in the cache 1022 or otherwise the NVM to translate the logical addresses specified in the read command to the physical addresses indicating the location of the data. The controller 1023 then reads the requested data from the memory location 1012 specified by the physical addresses by sensing the data using the sense amplifiers 1024 and storing them in data latches 1026 until the read data is returned to the host device 1004 via the host interface 1006.

Figure 12:
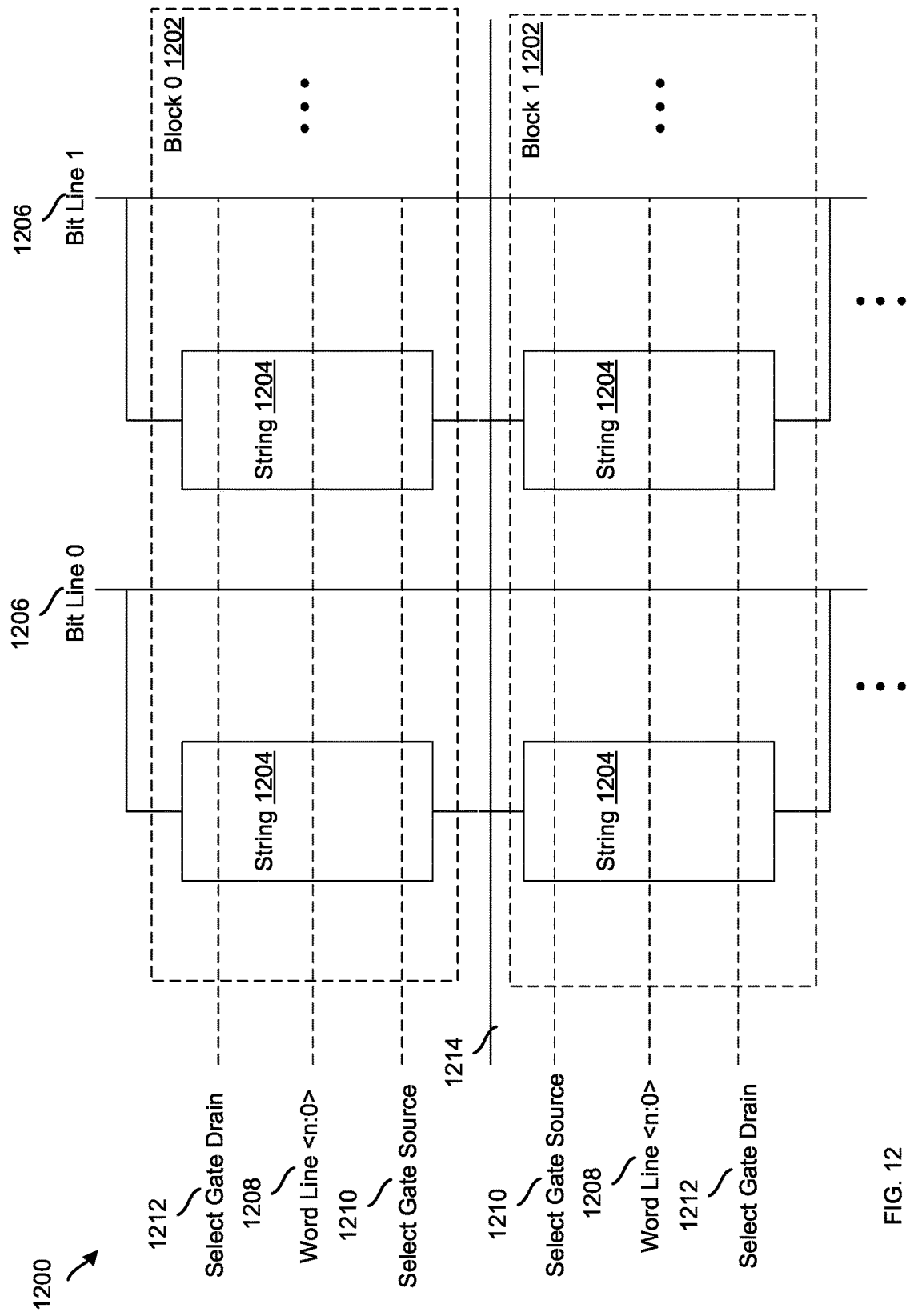
FIG. 12 is a graphical diagram illustrating an example of a voltage distribution chart for triple-level cells in the storage device of FIG. 1.

FIG. 12 illustrates an example of a NAND memory array 1200 of blocks 1202 including multiple strings 1204. Blocks 1202 may correspond to blocks of a die 1014 in the NVM 1010 of FIG. 10, and strings 1204 may each correspond to string 314 in FIG. 3. As in the memory array 300 of FIG. 3, each string 1204 may include a group of memory cells each coupled to a bit line 1206 and individually coupled to respective word lines 1208. Similarly, each string may include a SGS cell 1210 and SGD cell 1212 which respectively connects the memory cells in each string 1204 to a source line 1214 and bit line 1206.

When the controller 123 reads data from or writes data to a page 316 of cells 302 (i.e. on a word line 304, 1208), the controller may send a command to apply a read voltage or program voltage to the selected word line and a pass through voltage to the other word lines. The read or programmed state of the cell (e.g. a logic '0' or a logic '1' for SLCs) may then be determined based on a threshold voltage of the cells 302. For example, during an SLC read operation, if the threshold voltage of a cell 302 is smaller than the read voltage (i.e. current flows through the cell in response to the read voltage), the controller 123 may determine that the cell stores a logic '1', while if the threshold voltage of the cell 302 is larger than the read voltage (i.e. current does not flow through the cell in response the read voltage), the controller 123 may determine that the cell stores a logic '0'. Similarly, during an SLC program operation, the controller may store a logic '0' by sending a command to apply the program voltage to the cell 302 on the word line 304, 1208 until the cell reaches the threshold voltage, and during an erase operation, the controller may send a command to apply an erase voltage to the block 1202 including the cells 302 (e.g. to a substrate of the cells such as a p-well) until the cells reduce back below the threshold voltage (back to logic '1').

For cells that store multiple bits (e.g. MLCs, TLCs, etc.), each word line 304, 1208 may include multiple pages 316 of cells 302, and the controller may similarly send commands to apply read or program voltages to the word lines to determine the read or programmed state of the cells based on a threshold voltage of the cells. For instance, in the case of TLCs, each word line 304, 1208 may include three pages 316, including a lower page (LP), a middle page (MP), and an upper page (UP), respectively corresponding to the different bits stored in the TLC. In one example, when programming TLCs, the LP may be programmed first, followed by the MP and then the UP. For example, a program voltage may be applied to the cell on the word line 304, 1208 until the cell reaches a first intermediate threshold voltage corresponding to a least significant bit (LSB) of the cell. Next, the LP may be read to determine the first intermediate threshold voltage, and then a program voltage may be applied to the cell on the word line until the cell reaches a second intermediate threshold voltage corresponding to a next bit of the cell (between the LSB and the most significant bit (MSB)). Finally, the MP may be read to determine the second intermediate threshold voltage, and then a program voltage may be applied to the cell on the word line until the cell reaches the final threshold voltage corresponding to the MSB of the cell. Alternatively, in other examples, the LP, MP, and UP may be programmed together (e.g., in full sequence programming or Foggy-Fine programming), or the LP and MP may be programmed first, followed by the UP (e.g., LM-Foggy-Fine programming). Similarly, when reading TLCs, the controller 123 may read the LP to determine whether the LSB stores a logic 0 or 1 depending on the threshold voltage of the cell, the MP to determine whether the next bit stores a logic 0 or 1 depending on the threshold voltage of the cell, and the UP to determine whether the final bit stores a logic 0 or 1 depending on the threshold voltage of the cell.

Figure 13:
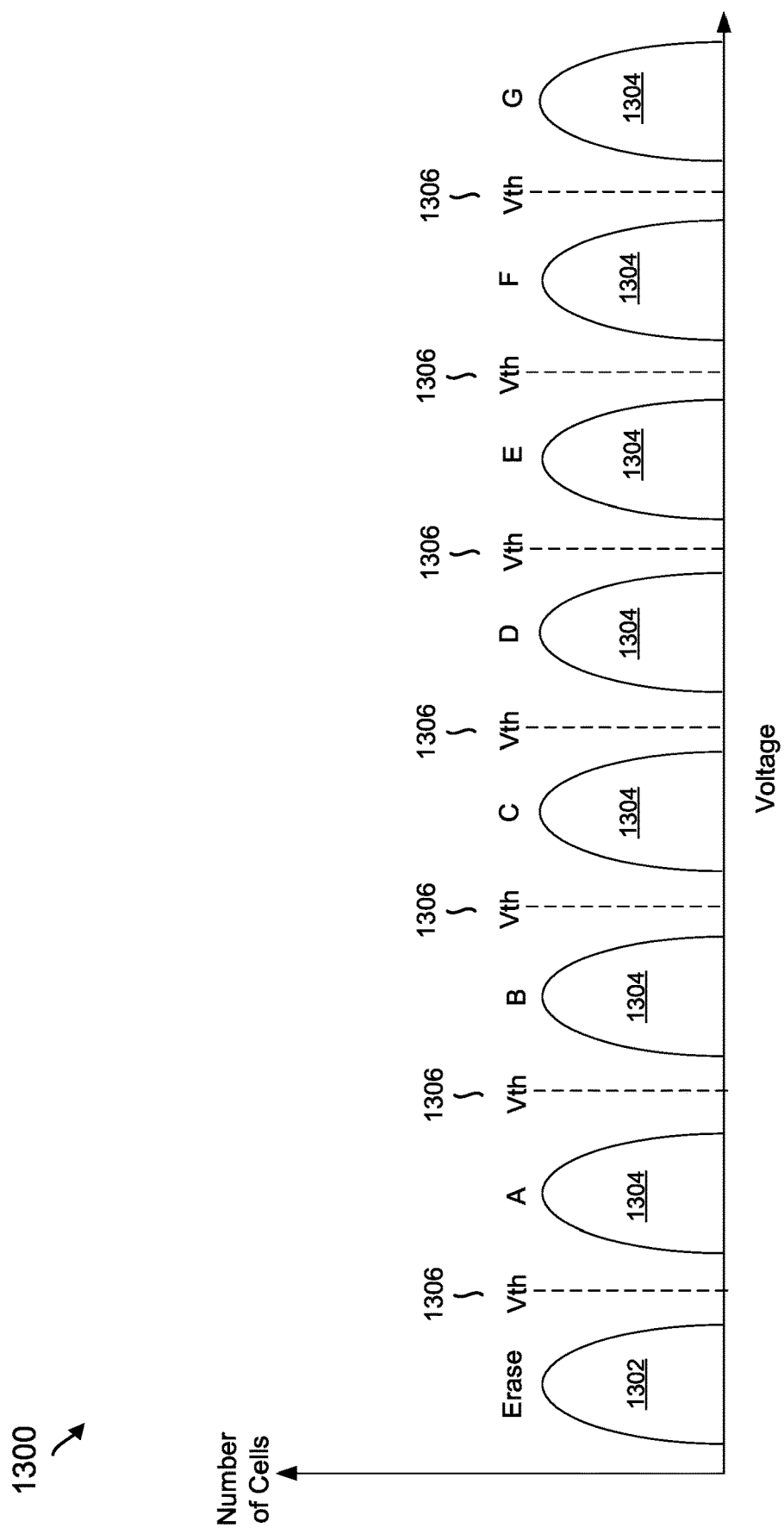
FIG. 13 is a conceptual diagram illustrating an example of a logical-to-physical mapping table in a non-volatile memory of the storage device of FIG. 1.

FIG. 13 illustrates an example of a voltage distribution chart 1300 illustrating different NAND states for TLCs (e.g. cells 116, 302) storing three bits of data (e.g. logic 000, 001, etc. up to logic 111). The TLCs may include an erase state 1302 corresponding to logic '111' and multiple program states 1304 (e.g. A-G) corresponding to other logic values '000-110'. The program states 1304 may be separated by different threshold voltages 1306. Initially, the cells 116, 302 may be in the erase state 1302, e.g. after the controller 123 erases a block 1202 including the cells. When the controller 123 program LPs, MPs, and UPs as described above, the voltages of the cells 116, 302 may be increased until the threshold voltages 1306 corresponding to the logic values to be stored are met, at which point the cells transition to their respective program states 1304. While FIG. 13 illustrates eight NAND states for TLCs, the number of states may be different depending on the amount of data that is stored in each cell 116, 302. For example, SLCs may have two states (e.g. logic 0 and logic 1), MLCs may have four states (e.g. logic 00, 01, 10, 11), and QLCs may have sixteen states (e.g. erase and A-N).

When the controller 123 attempts to program cells 116, 302 of a selected word line 304, 1208 into one of the program states 1304, the controller may perform incremental step pulse programming (ISPP) over a number of programming loops or ISPP cycles. For example, a programming voltage (e.g. a high voltage) may be applied to the selected word line 304, 1208, a pass through voltage (e.g. a high voltage lower than the programming voltage) may be applied to the other word lines 304, 1208, a bit line program voltage (e.g. a low voltage) may be applied on the bit lines 306, 1206 connected to the selected cells being programmed on the selected word line, and a bit line inhibit voltage (e.g. a high voltage) may be applied on the bit lines 306, 1206 connected to the other cells not being programmed on the selected word line. Applying a high programming voltage to the selected word line and a low voltage to the selected bit lines allows electrons to tunnel from the channel into the charge trapping layer of those selected cells, thereby causing the threshold voltage of the cells to increase. On the other hand, applying a high voltage to unselected bit lines inhibits electrons from tunneling from the channel into the charge trapping layer of those unselected cells, thereby preventing the threshold voltage of those cells from increasing. Thus, bit lines coupled to cells programmed to lower states may be inhibited to prevent the threshold voltage of those cells from increasing while other cells are programmed to higher states. For instance, in the case of TLCs, the bit lines of cells that are first programmed into the A state may be inhibited first, followed by the bit lines of different cells that are programmed into the B state, followed by those that reach the C state, then the D state, and so forth until the remaining cells on the selected word line ultimately reach the G state and all cells on the selected word line have been programmed.

After the programming voltage is applied in one programming loop or ISPP cycle, a program verify voltage (e.g. a low voltage) may be applied to the word line 304, 1208 to determine whether the threshold voltage of a cell has increased beyond a respective threshold voltage into an intended program state. If none of the cells have transitioned into an intended programming state, then another programming loop or ISPP cycle is performed in which a higher programming voltage may be applied to further increase the threshold voltage of the cells. Subsequently, a program verify voltage may again be applied to determine whether the threshold voltage of a cell has transitioned into an intended program state. The above process of incrementally increasing the programming voltage and verifying the voltage threshold of the selected cells may be repeated over a number of programming loops. If the cells transition into their respective programming states and the total number of programming loops does not exceed a predetermined loop count, the controller may determine that the cells have entered their intended program states and are thus successfully programmed. Otherwise, if the total number of programming loops exceeds the predetermined loop count before the cells transition into their respective programming states, the controller may determine that a program failure has occurred.

Figure 14:
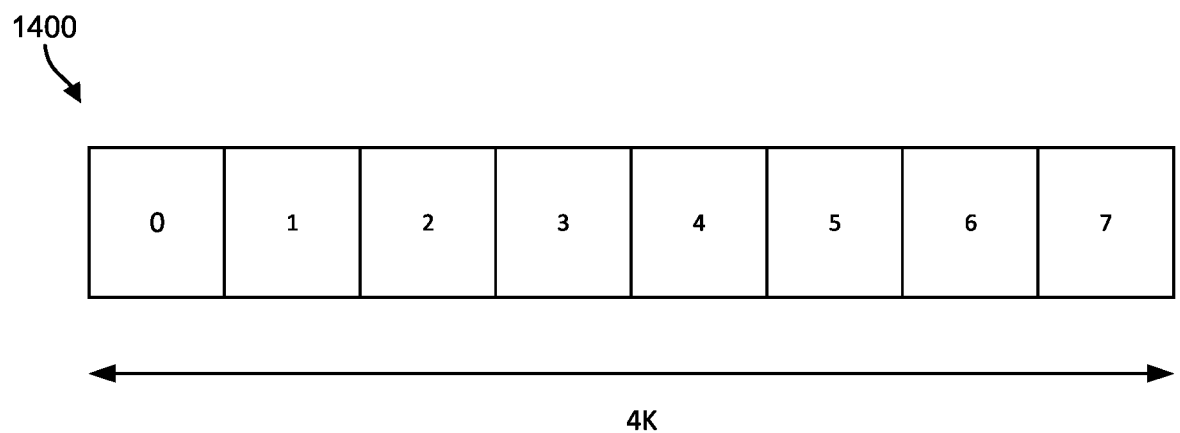
FIG. 14 is a diagram illustrating an aligned write command having a fixed number of sectors.

FIG. 14 is a diagram illustrating an aligned write command 1400 having a fixed number of sectors. Often, the storage system firmware is optimized for aligned host commands since many host protocols use aligned commands and various performance benchmark tools use aligned command patterns. As discussed above, the aligned command can refer to the command length being an integral multiple of the minimum write unit length. The minimum write unit length is the smallest length supported for NAND program operation in the FIM 1038. Typically, this length is 4 KB (i.e. 8 sectors, where each sector is 512 bytes as per standard definition of LBA/sector in storage device industry). As illustrated in FIG. 14, the aligned write command 1400 includes a command length of 8 sectors (e.g., sectors 0-7).

Figure 15:
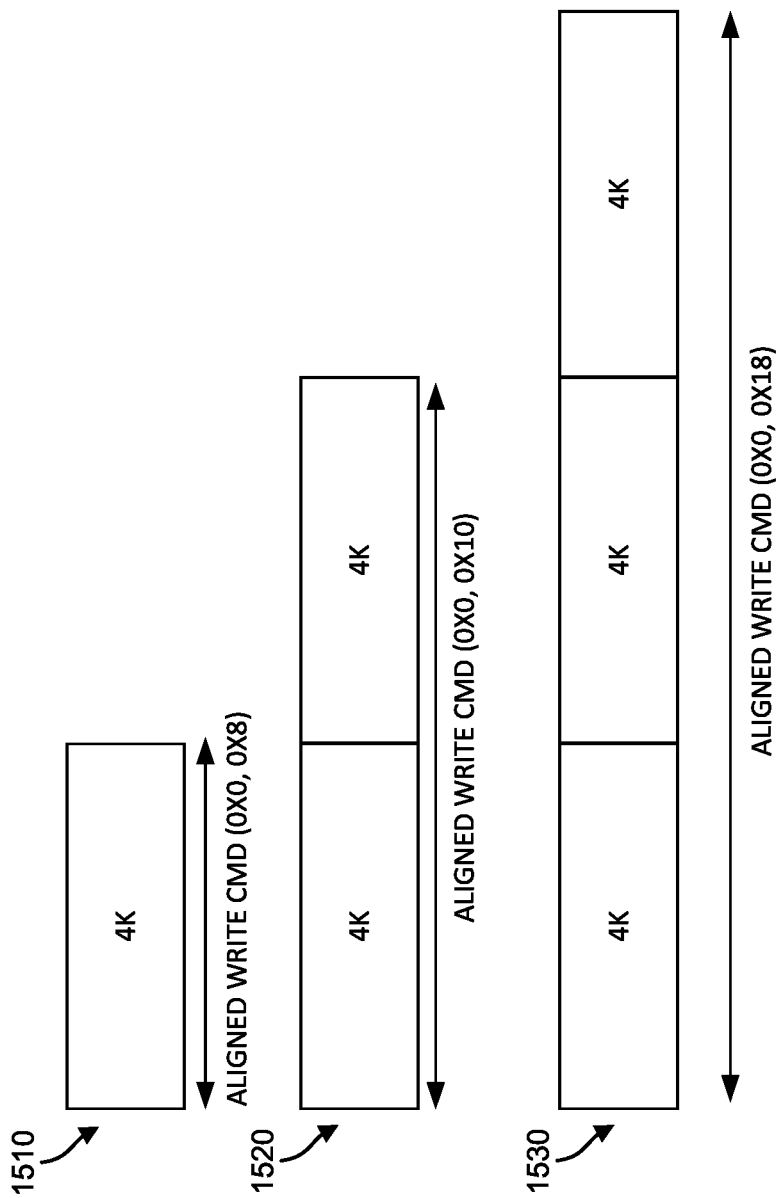
FIG. 15 is a diagram illustrating aligned write commands with different command lengths.

FIG. 15 is a diagram illustrating aligned write commands with different command lengths. In some aspects, the universal flash storage (UFS) protocol defines usage of aligned commands. An aligned write command refers to a start offset and a length of the command aligning to a minimum write unit length (e.g., 8-sector multiples). The two parameters considered for aligned commands is a start offset and the number of LBAs included in a host write command. If both parameters are aligned to the minimum write unit length, then the host write command can be referred to as an aligned write command. For example, the start offset of a first host write command 1510 is 0x0 and the command length is 8 to denote that the host write command includes 8 LBAs, so the host write command can be identified as aligned since the number of LBAs is a multiple of the minimum write unit length (e.g., 8 sectors). In a second example, the start offset of a second host write command 1520 is 0x0 and the command length is 16 to denote that the host command includes 16 LBAs, so the host write command can also be considered as aligned since the number of LBAs is a multiple of the minimum write unit length (e.g., 8 sectors). In another example, the start offset of a third host write command 1530 is 0x0 and the command length is 24 to denote that the host write command includes 24 LBAs, so the host command can also be considered as aligned since the number of LBAs is a multiple of the minimum write unit length (e.g., 8 sectors). However, if any one of the parameters, such as the start offset or the number of LBAs, or a combination thereof, does not result in a value for the host write command that is a multiple of the minimum write unit length, then the host write command may be identified as an unaligned write command.

Figure 16:
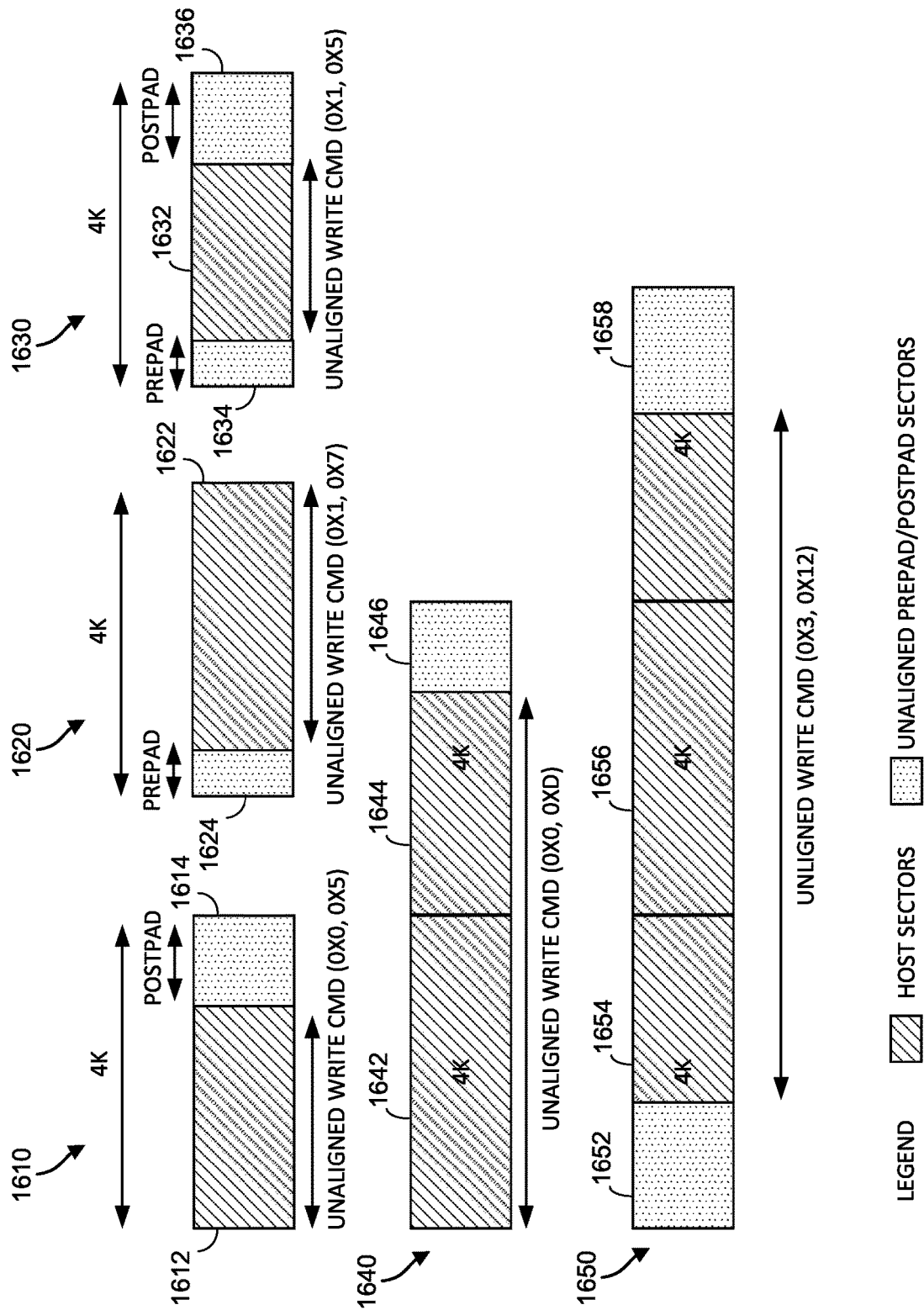
FIG. 16 is a diagram illustrating unaligned write commands with different pre-pad and post-pad configurations.

FIG. 16 is a diagram illustrating unaligned write commands with different pre-pad and post-pad configurations. For example, the start offset of a first host write command 1610 is 0x0 but the command length is 5 to denote that the host write command 1610 includes 5 sectors, so the host write command is identified as unaligned since the number of LBAs is not a multiple of the minimum write unit length (e.g., 8 sectors) and the host write command 1610 does not include all the number of host sectors that reaches the minimum write unit length in order to identify the host write command 1610 as an aligned command.

In some aspects, the controller may identify whether host sectors are needed at the front of the host write command 1610 or at the tail end of the host write command 1610 to adjust the command length to reach the minimum write unit length for writing the corresponding host data. In the first example, the first host write command 1610 has a command length (e.g., 1612) of 5 so the write command requires three additional sectors added to the tail end of the write command to complete the command with the minimum write unit length. In this regard, a post-pad sector 1614 of length three sectors can be appended to the tail end of the write command.

In a second example, the start offset of a second host write command 1620 is 0x1 and the command length is 7 to denote that the host write command 1620 includes only 7 sectors, so the host write command is identified as unaligned since the number of LBAs is not a multiple of the minimum write unit length (e.g., 8 sectors) and the host write command 1620 does not include all the number of host sectors needed to satisfy the minimum write unit length to be identified an aligned command. In the second example, the second host write command 1620 has a command length (e.g., 1622) of 7 that started at an offset of 1 so the write command requires one additional sector to be added at the front of the write command to complete the command with the minimum write unit length. In this regard, a pre-pad sector 1624 of length one sector can be appended to the front end of the write command.

In a third example, the start offset of a third host write command 1630 is 0x1 and the command length is 5 to denote that the host write command 1630 includes only 5 sectors, so the host write command is identified as unaligned since the number of LBAs is not a multiple of the minimum write unit length (e.g., 8 sectors) and the host write command does not include all the number of host sectors needed to satisfy the minimum write unit length to be identified an aligned command. In the third example, the third host write command 1630 has a command length (e.g., 1632) of 5 that started at an offset of 1 so the write command requires one additional sector to be added at the front of the write command and two additional sectors to be added at the tail end of the command to complete the command with the minimum write unit length. In this regard, a pre-pad sector 1634 of length one sector can be appended to the front end of the write command and a post-pad sector 1636 of length two sectors can be appended to the tail end of the write command.

In another example, a host write command 1640 may have a data size that extends across two chunks of data. However, the host device does not provide some sectors within a second chunk of the host write command 1640. The host write command 1640 may include a start offset of 0x0 and a command length of 13, where the first chunk includes 8 host sectors and the second chunk includes 5 host sectors. In this regard, the host write command 1640 is identified as unaligned because the number of LBAs (e.g., 13) is not a multiple of the minimum write unit length (e.g., 8 sectors) and the host write command 1640 does not include all the number of host sectors needed to satisfy the minimum write unit length to be identified as an aligned command. In this example, the host write command 1640 has a command length (e.g., 1642, 1644) of 13 that started at an offset of 0x0 so the write command requires three additional sectors to be added at the tail end of the second chunk of the write command to complete the command with the minimum write unit length. In this regard, a post-pad sector 1646 of length three sectors can be appended to the tail end of the write command.

In still another example, a host write command 1650 may have a data size that extends across three chunks of data. However, the host device does not provide some sectors within a first chunk of the host write command and some sectors within a third chunk of the host write command. The host write command 1650 may include a start offset of 0x3 and a command length of 18, where the first chunk includes 5 host sectors (e.g., 1654), the second chunk is complete with 8 host sectors (e.g., 1656), and the third chunk includes 5 host sectors (e.g., 1658). In this regard, the host write command 1650 is identified as an unaligned command because the number of LBAs (e.g., 18) is not a multiple of the minimum write unit length (e.g., 8 sectors) and the host write command 1650 does not include all the number of host sectors needed to satisfy the minimum write unit length to be identified as an aligned command. In this example, the host write command 1650 has a command length (e.g., 1654) of 18 that starts at an offset of 3 within the first chunk so the write command requires three additional sectors to be added at the front of the write command and three additional sectors to be added at the tail end of the command to complete the command with the minimum write unit length. In this regard, a pre-pad sector 1652 of length three sectors can be appended to the front end of the write command and a post-pad sector 1658 of length three sectors can be appended to the tail end of the write command 1650.

Figure 17:
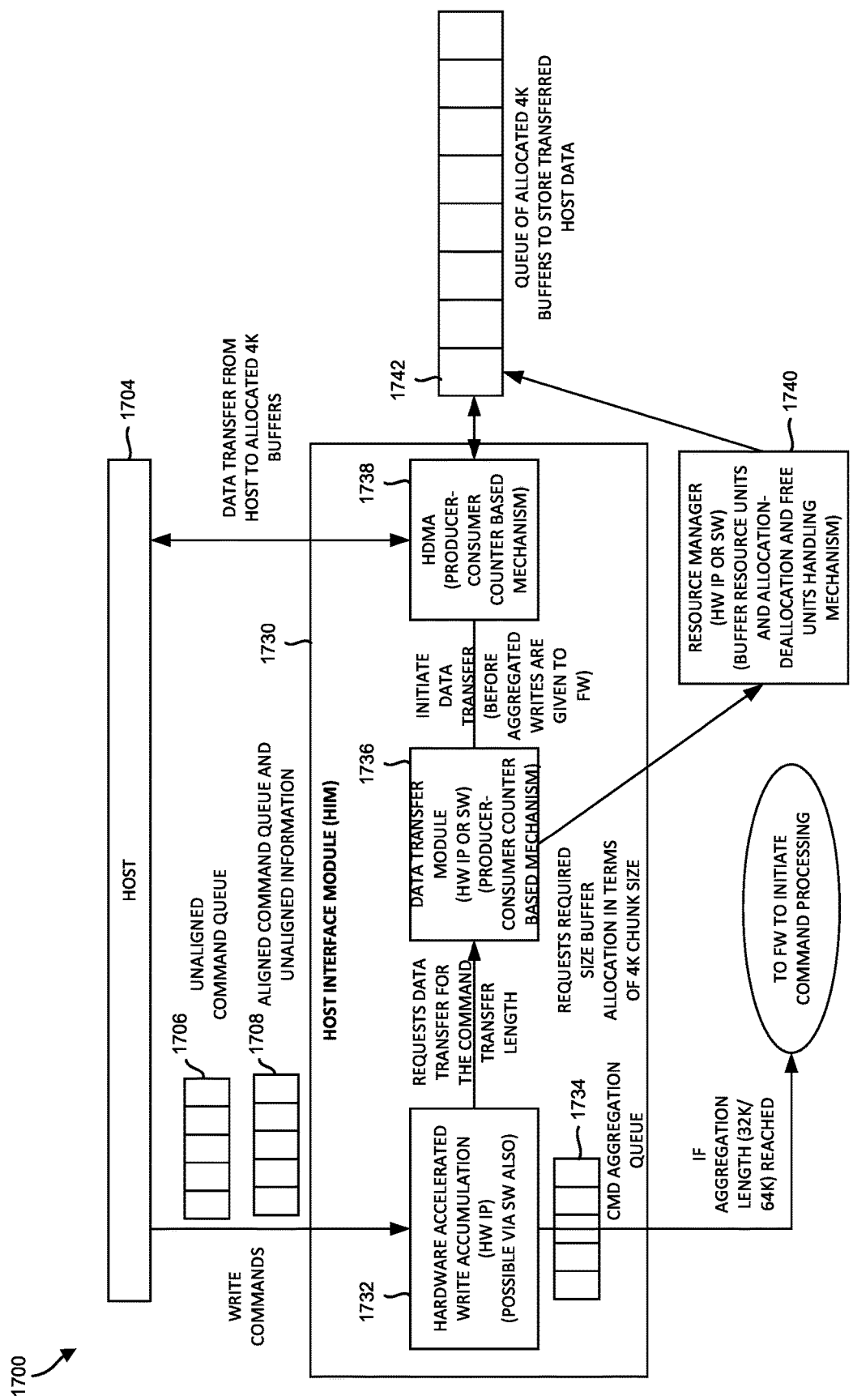
FIG. 17 is a block diagram illustrating a storage device for unaligned write handling in hardware accelerated write caching in an aligned command based firmware architecture.

FIG. 17 is a block diagram 1700 illustrating a storage device for unaligned write handling in hardware accelerated write caching in an aligned command based firmware architecture. In FIG. 17, a host device 1704 sends host write commands to the storage device 102 and a command queue 1706 receives the host write commands. The controller 1023 determines that the received host write commands are unaligned write commands because neither of the start offsets align with corresponding host data offsets and the command lengths are not multiples of the minimum write unit length. The unaligned write commands can be converted into aligned write commands and stored in an aligned command queue 1708 along with unaligned information. In some aspects, the generated unaligned information may be stored separately in an unaligned information queue (not shown).

The firmware 1034 can be assisted by a hardware accelerated write accumulation module 1732, which facilitates aggregation of small aligned writes by performing data transfer using a data transfer module 1736. In some aspects, the hardware accelerated write accumulation module 1732 can be implemented via firmware in some embodiments, or implemented via software in other embodiments. The data transfer module 1736 may operate as a producer-consumer based mechanism that handles host data transfers. The data transfer module 1736 can be implemented via hardware/firmware in some embodiments, or implemented via software in other embodiments. The data transfer module 1736 may be utilized by a host interface module 1730 to cache buffers and avoid firmware layer processing overheads (if a host write command was being processed one by one) until a threshold amount of data is accumulated (e.g. transfer sizes of 32K or 64K). For example, the hardware accelerated write accumulation module 1732 may aggregate 32K size of transfer data size among the aggregated command sizes. In some aspects, this may occur in 1 command (of 32K, 64K or higher command sizes), 2 commands (of 16K each or higher command sizes), or 8 commands (of 4K each). This framework improves write performance of the storage drive.

In some aspects, the hardware accelerated write accumulation module 1732 receives the write commands directly from the host device 1704 and accumulates the write commands in an aggregation command queue 1734 (up to a predefined aggregation length) before passing the write commands to firmware (e.g., firmware 1034). In other aspects, the hardware accelerated write accumulation module 1732 receives the aligned write commands from the aligned command queue 1708 for accumulation at the aggregation command queue 1734. If the predefined aggregation length is reached, the hardware accelerated write accumulation module 1732 passes the accumulated write commands to firmware to initiate command processing. In some aspects, the aggregation length is set to 32 KB such that the aggregation command queue 1734 can accumulate up to 8 commands (where each command has a command length of 4 KB). In other aspects, the aggregation length is set to 64 KB such that the aggregation command queue 1734 can accumulate up to 16 commands.

In some aspects, while the hardware accelerated write accumulation module 1732 is performing the command aggregation, the hardware accelerated write accumulation module 1732 is attempting to initiate data transfers from the host device 1704 in parallel. For example, when a new write command is received at the aggregation command queue 1734, the hardware accelerated write accumulation module 1732 sends a request to the data transfer module 1736 to initiate a data transfer for a prior write command to a pool of memory buffers. In this regard, the request indicates a request for a data transfer for the command transfer length. The hardware accelerated write accumulation module 1732 may utilize a hardware direct memory access (HDMA) module 1738 to perform the data transfer, which will transfer the host data into a queue 1742 that includes one or more allocated buffer resource units to store transferred host data. In some aspects, the HDMA module 1738 may operate as a producer-consumer counter based mechanism. The buffer resource units may be controlled by a resource manager 1740. In some aspects, the resource manager 1740 can be implemented via firmware in some embodiments, or implemented via software in other embodiments. The resource manager 1704 may operate as a handling mechanism for allocation of the buffer resource units in the queue 1742 and deallocation to free the resource units. The data transfer module 1736 sends a request to the resource manager 1740 to allocate the one or more buffer resource units in which it can transfer the host data by using the HDMA module 1738.

Once the firmware 1034 receives the aggregated write commands from the aggregation command queue 1734, the firmware 1034 can access the queue of allocated memory buffers (e.g., 1742) to identify which buffers contain stored transferred host data to submit for a NAND memory operation. In some aspects, some of the queue of allocated memory buffers 1742 may include host data that is in the process of being transferred, of which the HDMA module 1738 may wait for the transfer operation to complete at the memory buffer queue before sending that host data for the NAND memory operation.

In firmware, there are multiple layers to process a write command. For example, a first layer can involve initial command processing, a second layer can refer to a data path layer, and a third layer may refer to a NAND operation layer. In some aspects, the hardware accelerated write accumulation module 1732 handles incoming write commands one by one that arrive from the host device 1004 with firmware layer processing overhead. In this regard, it is beneficial to accumulate the write commands as opposed to handling the commands one-by-one to reduce the firmware layer processing overhead.

All write commands that are aggregated at the aggregation command queue 1734 are aligned write commands, so the host data that is transferred into the queue of allocated memory buffers 1742 that is intended to be used to perform a NAND write, that host data is delivered by the host device 1004 with all of the LBAs that the host device 1004 intends to write. However, in a case of an unaligned write command, the host device 1004 does not provide all sectors within the host data that it intends to write. If the same firmware architecture that utilizes the hardware assisted write caching with the aggregation mechanism is used, the memory buffers (e.g., 1742) will not have all LBA data available. In this regard, the buffer sequence may include portions of transferred host data that does not include host sectors for processing.

When the firmware has to be used with the host device 1004, where unaligned write commands are present, the host interface module 1730 needs the unaligned command handling feature. The unaligned write handling requires pre-pad and/or post-pad handling, data transfer of host sectors into a memory buffer at a correct offset in the memory buffer, and initiate a read-modify-write operation to perform pre-pad and/or post-pad additions before writing the host data to NAND.

A legacy aligned command based firmware architecture using hardware assisted write caching may not handle unaligned writes with optimal performance. For example, the firmware 1034 may handle the unaligned write command one by one. After the host device 1004 has transferred the host sectors to an allocated 4 KB buffer, the firmware can read the pre-pad and/or post-pad sectors (as applicable) and perform a read-modify-write operation to combine the two data to form a complete write data and program it to the NAND. However, the latency of performing a pre-pad/post-pad sector read, which is performed for each host write command one-by-one, can adversely impact the write performance.

Figure 18:
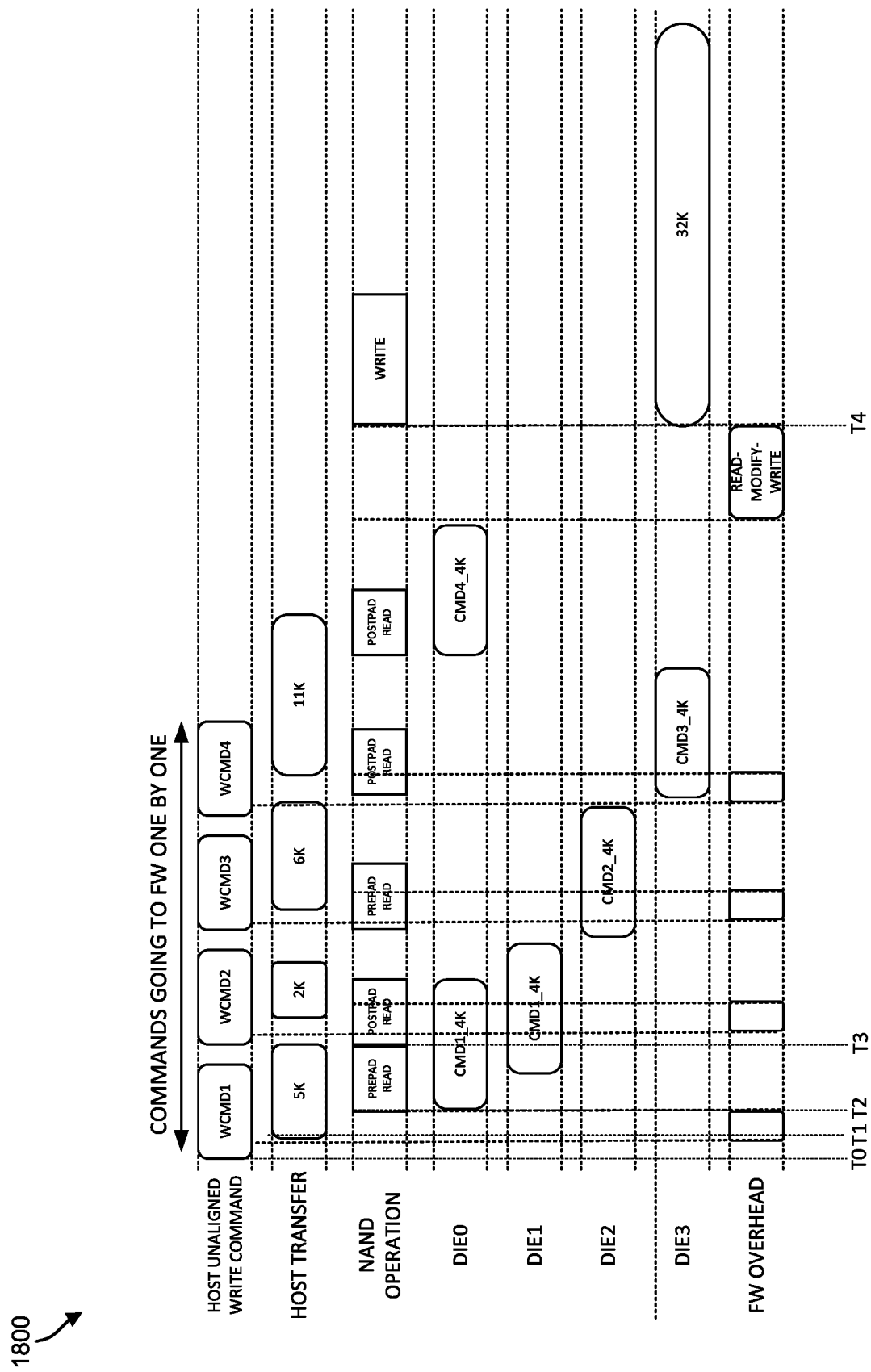
FIG. 18 is a timing diagram illustrating legacy handling of unaligned write commands without aggregation.

FIG. 18 is a timing diagram 1800 illustrating legacy handling of unaligned write commands without aggregation. The host write commands from a host device (e.g., 1704) are received and handled one by one, without any aggregation. The NAND activity with this type of legacy handling is not optimized. For example, at time t0, a first host write command (denoted as "WCMD1") is received from the host device and identified as an unaligned write command. At time t1, the first host write command is sent to firmware for command processing, and at around the same time, a host transfer operation is initiated to transfer 6 KB of host data to the memory buffers for sectors that the host device has given.

Once the first host write command is processed, a second host write command can be passed on from a command queue to firmware for processing and a second host data transfer operation can be initiated. Because the second host write command is acted on until the first host write command is fully processed with its corresponding host data being programmed, the added latency for processing any subsequent host write command in sequence adversely impacts the programming performance of the storage device.

Since the first host write command is unaligned and includes a start offset and command length that are non-multiples with the minimum write unit length, there are pre-pad and post-pad read operations involved. At time t2, once the first host write command is accepted by firmware for processing, the firmware triggers a pre-pad read operation with a first memory die (denoted as "Die0") to obtain a pre-pad sector. At time t3, the firmware triggers a post-pad read operation with a second memory die (denoted as "Die1") to obtain a post-pad sector. The firmware thereafter performs a read-modify-write operation to modify the data buffer, where host sectors are transferred at appropriate offsets, to add the fetched pre-pad/post-pad sectors to empty sectors within that data buffer and thereby generate aligned data with the prepended pre-pad data and/or appended post-pad sector data for NAND programming. The aligned data is produced from a combination of the pre-pad sector and the post-pad sector with the original host data. At time t4, the firmware triggers a write operation to write the aligned data to a third memory die (denoted as "Die 2").

Figure 19:
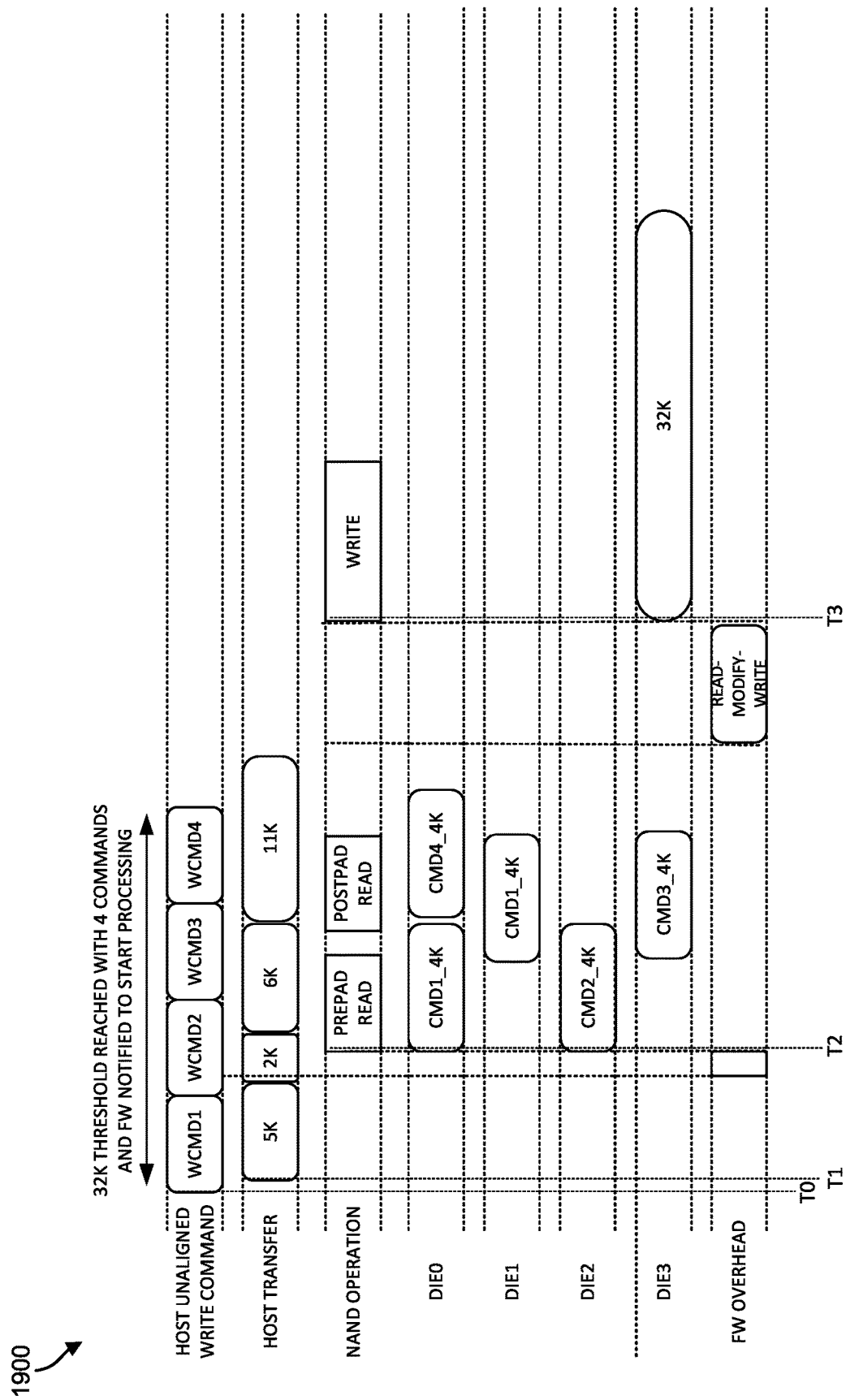
FIG. 19 is a timing diagram illustrating handling of unaligned write commands with aggregation.

FIG. 19 is a timing diagram 1900 illustrating unaligned write commands handled with command aggregation. The host write commands from a host device (e.g., 1704) are received and accumulated prior to any NAND operations (e.g., pre-pad read operation, post-pad read operation, write operation). For example, starting at time t0, a series of host write commands (respectively denoted as "WCMD1", "WCMD2", "WCMD3", "WCMD4") are received from the host device and each identified as an unaligned write command. The series of host write commands are accumulated at an aggregation command queue 1734 before being passed to firmware for command processing. At time t1, the first host write command is sent to firmware for command processing, and at around the same time, a host transfer operation is initiated to transfer 5 KB of host data to the memory buffers for sectors that the host device has given. Thereafter, a second host data transfer request is initiated to have 2 KB of host data that corresponds to WCMD2 transferred. Subsequently, another host data transfer request is initiated to transfer 6 KB of host data corresponding to WCMD3 and thereafter another host data transfer request is initiated to transfer 11 KB of host data corresponding to WCMD4. Once the aggregation command queue has reached a threshold size of queued write command transfer sizes (e.g., 32K, 64K or higher sizes), firmware triggers pre-pad and post-pad read operations for all of the host write commands in parallel. For example, at time t2, the firmware triggers a pre-pad read operation with a first memory die (denoted as "Die0") to obtain a pre-pad sector for WCMD1 (e.g., includes a non-zero start offset), and concurrently, triggers another pre-pad read operation with a third memory die (denoted as "Die2") to obtain a pre-pad sector for WCMD2. Subsequently, firmware triggers concurrent post-pad read operations with the first memory die, a second memory die (denoted as "Die1") and a fourth memory die (denoted as "Die3") to obtain post-pad sectors for WCMD4, WCMD1 and WCMD3, respectively. At time t3, the firmware triggers a write operation to write an aligned write command to the fourth memory die ("Die 3"). In this regard, the aligned write command is produced from a combination of the pre-pad sector and the post-pad sector with the original host write command, where the aligned write command has a command length that corresponds to the minimum write unit length. Because the pre-pad and post-pad operations are initiated and performed in parallel, the firmware overheads are significantly decreased (compared to the legacy handling without aggregation as discussed in FIG. 18), which in turn significantly improves the programming performance of the storage device.

Figure 20:
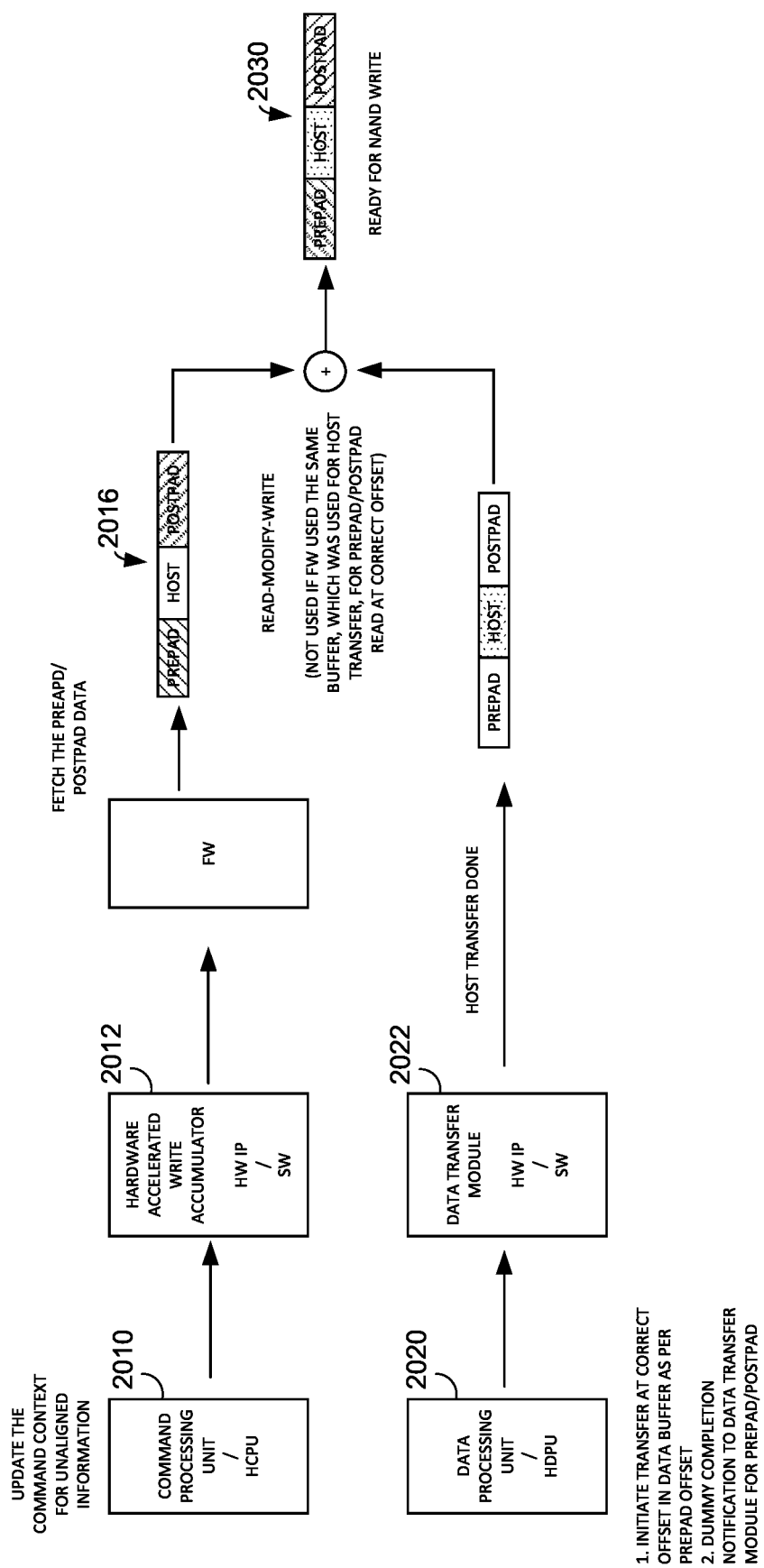
FIG. 20 is a conceptual diagram illustrating unaligned write aggregation and data caching in parallel with firmware processing of pre-pad/post-pad read operations.

FIG. 20 is a conceptual diagram illustrating unaligned write aggregation and data caching in parallel with firmware processing of pre-pad/post-pad read operations. The hardware accelerator units (e.g., the hardware accelerated write accumulation module 2012) or FW/SW handling for command aggregation and data transfer can use the aligned command handling approach for command aggregation and transfer. The firmware can trigger pre-pad/post-pad sector internal read operations in parallel with initiating a host data transfer using stored unaligned information. The non-blocking architecture of the firmware helps in performing the two operations in parallel.

In some aspects, a HIM command processing unit (HCPU) 2010 handles conversion of an unaligned command to an aligned command. To enable this, an unaligned command received from a host device (not shown) is passed as an aligned command by the HCPU 2010. In some aspects, the received unaligned command may be marked as an aligned command so that the hardware accelerated write accumulation module 2012 does not attempt to handle the unaligned commands one by one (as discussed with reference to the legacy handling of unaligned commands without aggregation in FIG. 18). In some aspects, the hardware accelerated write accumulation module 2012 may correspond to the hardware accelerated write accumulation module 1732 of FIG. 17. Unaligned information for each of the unaligned write commands can be generated by the HCPU 2010 and stored along with the aligned commands in an aligned command queue (or stored separately in an unaligned information queue). For example, the HCPU 2010 can store the unaligned information of pre-pad/post-pad sectors for the converted aligned command. In some aspects, the unaligned information indicates, for each unaligned write command, the start offset information, which host sectors are omitted (or missing) from the host write command, the pre-pad sector information, and post-pad sector information. In some aspects, the unaligned information may be stored in volatile memory.

A HIM data processing unit (HDPU) 2020 handles the unaligned host sector transfer to a correct offset in a 4K buffer using a Host DMA (HDMA) (not shown). For example, the HDPU 2020 may transfer host sectors to the write cache buffer at correct offsets using the generated unaligned information. In other aspects, the HDPU 2020 may utilize a Flash DMA (FDMA) to handle the unaligned host sector transfer. The HCPU 2010 and HDPU 2020 may be implemented via a CPU in some embodiments, or may be implemented via firmware in other embodiments. The CPU based solution may be more efficient due to parallelism achieved as described below.

When host sectors are transferred to designated cache buffers, the firmware can perform read-modify-write of the cache buffer with pre-pad/post-pad sectors before submitting for NAND programming.

The above two steps with the HCPU 2010 and HDPU 2020 can be performed on the main processor in the controller 1023, where the HIM module 1730 is not CPU based. One of the advantages with the CPU-based HIM module 1730 is that it can help in reducing latencies associated with the command handling and data transfer handling. In some embodiments, the subject technology may be implemented without the HCPU 2010, the HDPU 2020 and hardware accelerators (e.g., 2012), with the firmware taking full responsibility of performing the unaligned write handling.

In some aspects, the hardware accelerated write accumulation module 2012 performs aggregation as per its normal functionality since it sees all received host write commands as aligned commands. If there is no hardware accelerator in the controller 1023 (or in the HIM module 1730) for aggregating unaligned writes, then the firmware executing on the main processor can take full responsibility of performing this command aggregation.

In some aspects, the data transfer module 2022 performs normal functionality of 4K based transfer of host data, with the HDPU 2020 passing short-length transfers (e.g., lesser than 4K data transfers) as full 4K transfers because of unaligned command lengths.

The firmware can trigger the pre-pad/post-pad read operations of all aggregated unaligned writes in parallel, either in the same buffer where the host device is transferring its host sectors or in a local buffer if host transfer buffer is still not allocated. In some aspects, the firmware can handle the read-modify-write in the cached host data of 32K or 64K in the empty sectors of the 4K buffers part of 32K or 64K aggregation cache. As illustrated in FIG. 20, the firmware can read a cache buffer to fetch the pre-pad/post-pad data for all aggregated aligned writes in parallel with the ongoing host data transfers. The firmware can modify the data buffer, where host sectors are transferred at appropriate offsets, to prepend the fetched pre-pad data 2016 and/or append the fetched post-pad data 2016 to empty sectors within that data buffer and thereby produce aligned host data 2030 for NAND programming.

Figure 21:
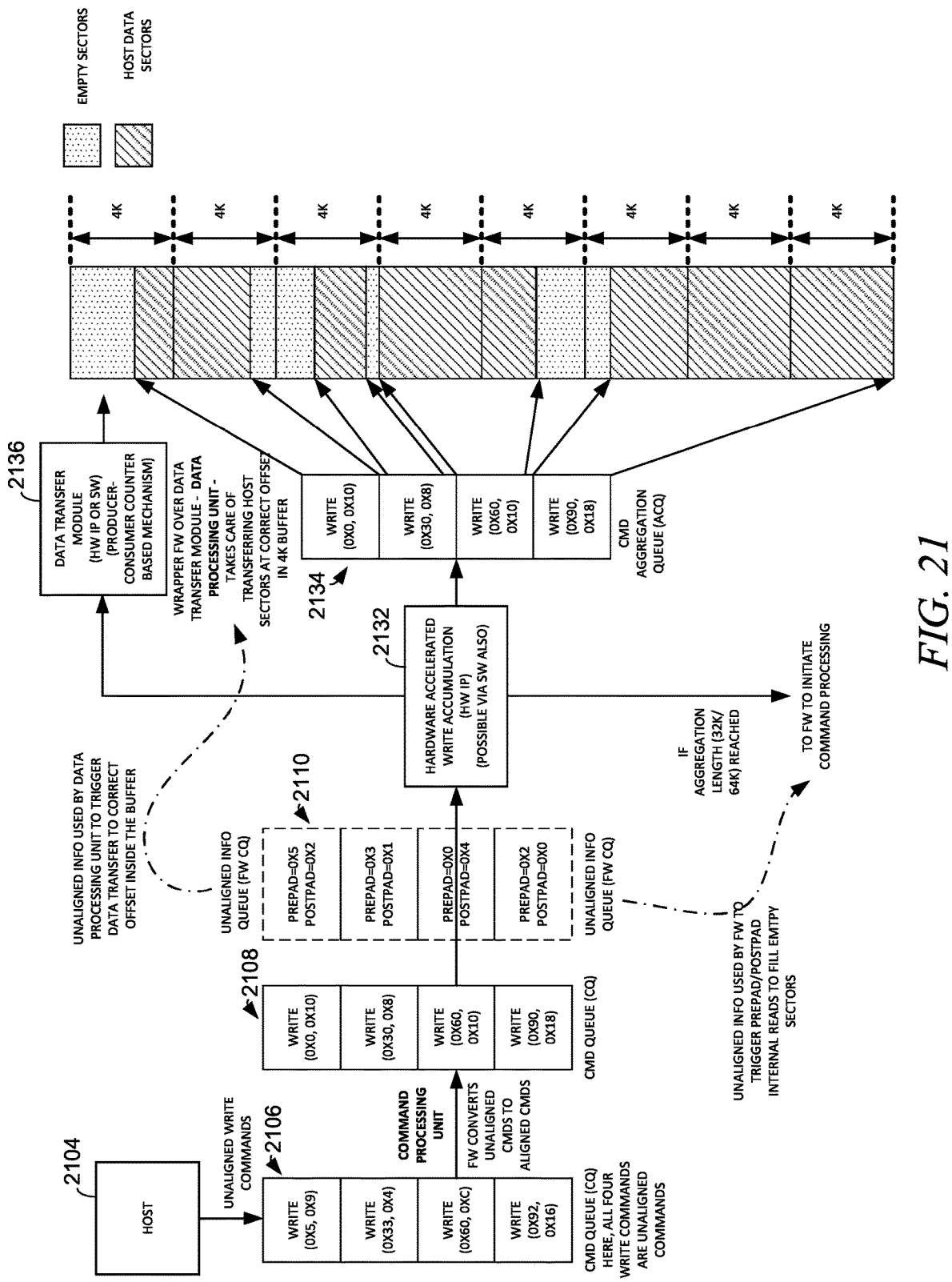
FIG. 21 is a conceptual diagram illustrating unaligned write handling in an aligned command based firmware architecture.

FIG. 21 is a conceptual diagram illustrating unaligned write handling in an aligned command based firmware architecture. In FIG. 21, a host device 2104 sends host write commands to the storage device 102 and a command queue 2106 receives the host write commands. The controller 1023 determines that the received host write commands are unaligned write commands because neither of the start offsets align with corresponding host data offsets and the command lengths are not multiples of the minimum write unit length. The firmware executing on a command processing unit of the controller 1023 may convert the unaligned write commands into aligned write commands. For example, for a first unaligned write command (having a start offset of 0x5 and a command length of 0x9), the command processing unit generates a converted aligned command with a start offset of 0x0 and adjusts the command length to 0x10 (or 16 sectors). The command processing unit stores the converted aligned command in an aligned command queue 2108. In turn, the command processing unit generates unaligned information for the first unaligned write command, where the unaligned information indicates that the start offset of 0x5 will require a pre-pad sector of length 0x5 sectors to fill the empty sectors at the front-end of the unaligned command and further indicates that the command length of 0x9 sectors will require a post-pad sector of length 0x2 sectors (since the combination of the start offset and command length extends up to 14 sectors) to fill the empty sectors at the tail end of the unaligned write command. In some aspects, the command processing unit generates the unaligned information based on an offset difference between the unaligned write commands and the converted aligned commands. The command processing unit may store the generated unaligned information in an unaligned information queue 2110. A hardware accelerated write accumulation module 2132 can refer to the aligned command queue 2108 and aggregate the aligned write commands into an aggregation command queue 2134. For each aligned command that is aggregated into the queue 2134, the hardware accelerated write accumulation module 2132 initiates a data transfer request with a data transfer module 2136. A data processing unit executing on the data transfer module 2136 can refer to the unaligned information queue 2110 to transfer the corresponding host sectors at correct offsets in memory buffers. In some aspects, the memory buffers are divided into 4 KB chunks. As illustrated in FIG. 21, for example, the first aligned write command (e.g., start offset 0x0 and command length 0x10) has corresponding host data transferred to a memory buffer with a start offset of 0x5 for a command length of 0x9 ending at sector 13. In this regard, the data processing unit can append a pre-pad sector of length 0x5 starting at offset 0x0 and a post-pad sector of length 0x2 that is appended starting at offset 0xE.

The data transfer for aggregated writes happens at the appropriate offset in the 4K buffers. The firmware may refer to each command in the aggregation command queue 2234 and, if a write command is unaligned, utilizes the same data transfer module allocated buffer to append the pre-pad/post-pad sectors data by an internal read operation. If a 4K buffer remains unallocated by the data transfer module 2236 for a command from the aggregation command queue 2134, the firmware allocates temporary 4K buffers and performs pre-pad/post-pad read operations and copies to the data transfer module 2136 allocated buffer once a data transfer for that command is finished. There may be additional information maintained at the unaligned information queue 2110, which is used by the data processing unit for determining a buffer sector offset for data transfer via a HDMA (e.g., HDMA 1738) and then, by firmware for pre-pad/post-pad data handling. There may be additional requirements of an ECC engine (low-density parity-check (LDPC)/Bose-Chaudhuri-Hocquenghem (BCH) codes) to support unaligned transfers to provide pre-pad/post-pad sectors only from the full 4K/16K sensed page data. As shown in FIG. 21, the firmware performs pre-pad and post-pad sectors read operations and transfers either directly to an allocated buffer (avoids copy operation) or stores in a local buffer (needs copy operation). Finally, the cached buffer of 32K for SLC/96K for TLC/128K for QLC is submitted for NAND programming, achieving improved unaligned write performance compared to one-by-one command handling in legacy approaches.

Figure 22:
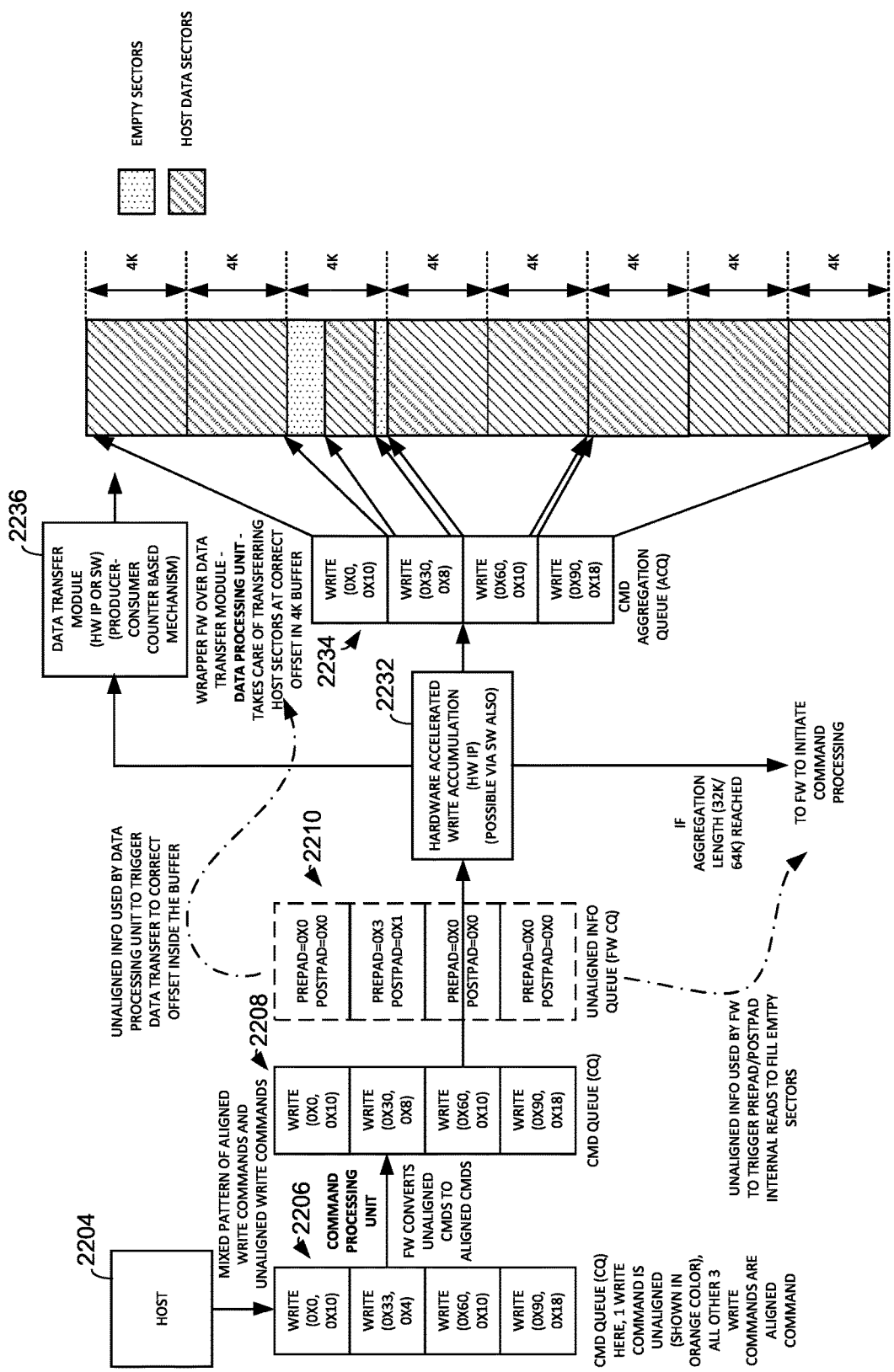
FIG. 22 is a conceptual diagram illustrating a mixed pattern of aligned write commands and unaligned write commands programmed with an unaligned write handling framework.

FIG. 22 is a conceptual diagram illustrating a mixed pattern of aligned write commands and unaligned write commands programmed with an unaligned write handling framework. In FIG. 22, a host device 2204 sends host write commands to the storage device 102 and a command queue 2206 receives the host write commands. The controller 1023 determines that a subset of received host write commands are aligned write commands and another subset of received host write commands are unaligned write commands because neither of the start offsets align with corresponding host data offsets and the command lengths are not multiples of the minimum write unit length. For example, the second received host write command has a start offset of 0x33 with a command length of 0x4 that is identified as an unaligned write command. The firmware executing on a command processing unit of the controller 1023 may convert the unaligned write command into an aligned write command. For example, the command processing unit generates a new aligned command with a start offset of 0x30 based on the unaligned start offset of 0x30 and adjusts the command length from 0x4 to 0x8. The command processing unit stores the received aligned write commands and the converted aligned command in an aligned command queue 2208. In turn, the command processing unit generates unaligned information for the unaligned write command, where the unaligned information indicates that the start offset of 0x33 will require a pre-pad sector of length 0x3 sectors to fill the empty sectors at the front-end of the unaligned command and further indicates that the command length of 0x4 sectors will require a post-pad sector of length 0x1 sectors (since the combination of the start offset and command length extends up to 7 sectors) to fill the empty sector at the tail end of the unaligned write command. The command processing unit may store the generated unaligned information in an unaligned information queue 2210. Although a subset of received write commands were identified as aligned write commands, the command processing unit still generates unaligned information for these received write commands. However, the unaligned information associated with the aligned write commands indicates zeroed offsets to denote that these received write commands are aligned upon receipt from the host device 2204, and thus, no adjustments are needed at data transfer to the memory buffers.

The firmware may refer to each aligned write command in the aggregated command queue 2232 and perform pre-pad/post-pad handling only for those align write commands that have associated unaligned information with non-zero pre-pad/post-pad sector information. Hence, the mixed pattern of aligned writes and unaligned writes can be handled in a more optimized manner. This can be beneficial to improve the write performance of the system when a small-sized file system writes during an aligned write command pattern.

Figure 23:
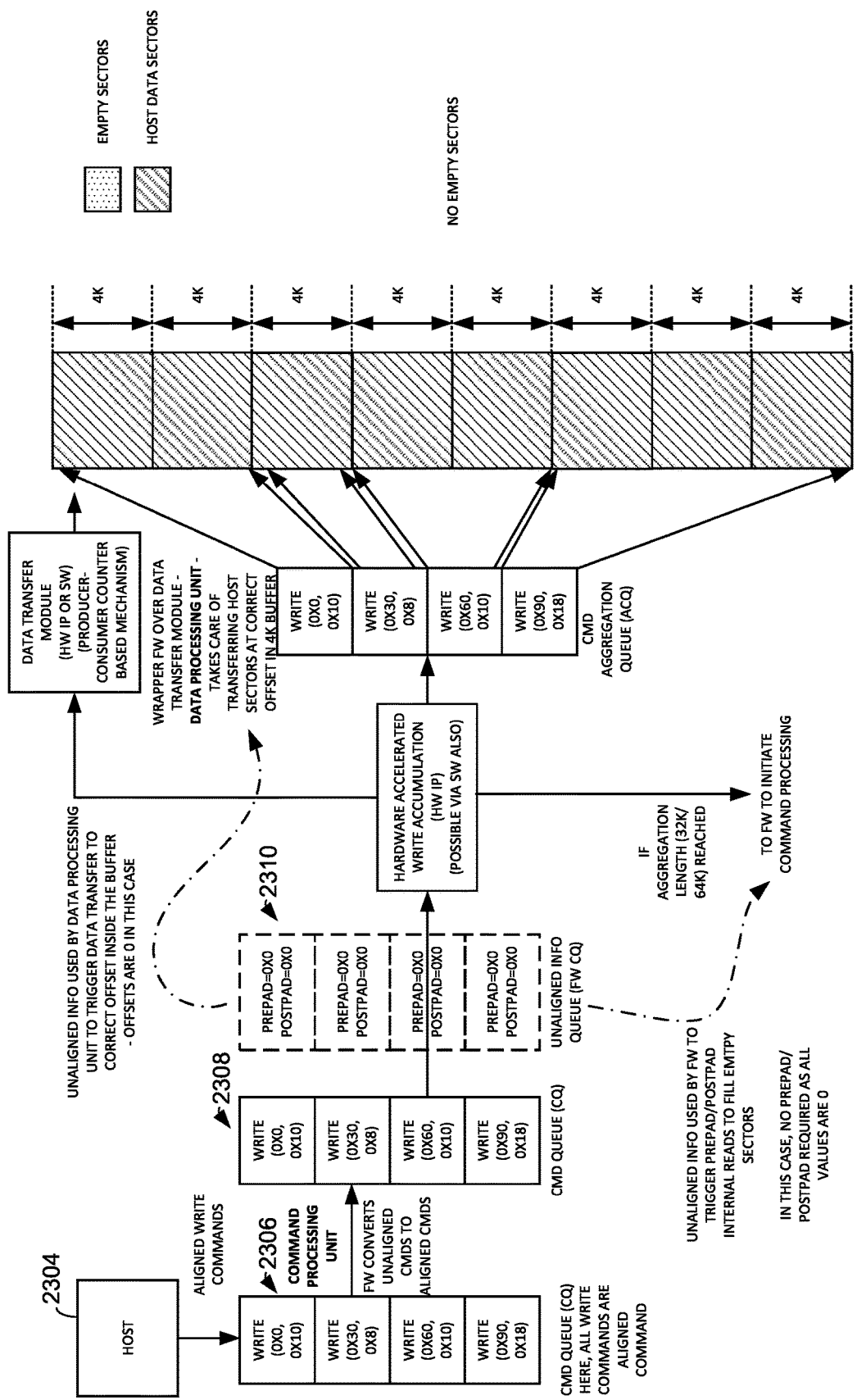
FIG. 23 is a conceptual diagram illustrating aligned write commands programmed with an unaligned write handling framework.

FIG. 23 is a conceptual diagram illustrating aligned write commands programmed with an unaligned write handling framework. The framework illustrated in FIG. 23 is backward compatible to handle aligned writes received from a host device 2304. In FIG. 23, the host device 2304 sends host write commands to the storage device 102 and a command queue 2306 receives the host write commands. The controller 1023 determines that the received host write commands are aligned write commands. The command processing unit stores the received aligned write commands in an aligned command queue 2308. Although the received write commands are aligned commands, the command processing unit generates unaligned information for the aligned write commands. In the case of receiving all aligned write commands, the command processing unit does not perform any pre-pad/post-pad read operations. In this regard, the unaligned information indicates zeroed pre-pad/post-pad lengths since no adjustments are required at data transfer to the memory buffers. The command processing unit may store the generated unaligned information in an unaligned information queue 2310. The firmware detects by checking the unaligned information queue 2310, where pre-pad/post-pad lengths are set to zero. In this regard, no additional overhead is observed during legacy aligned write handling.

Figure 24:
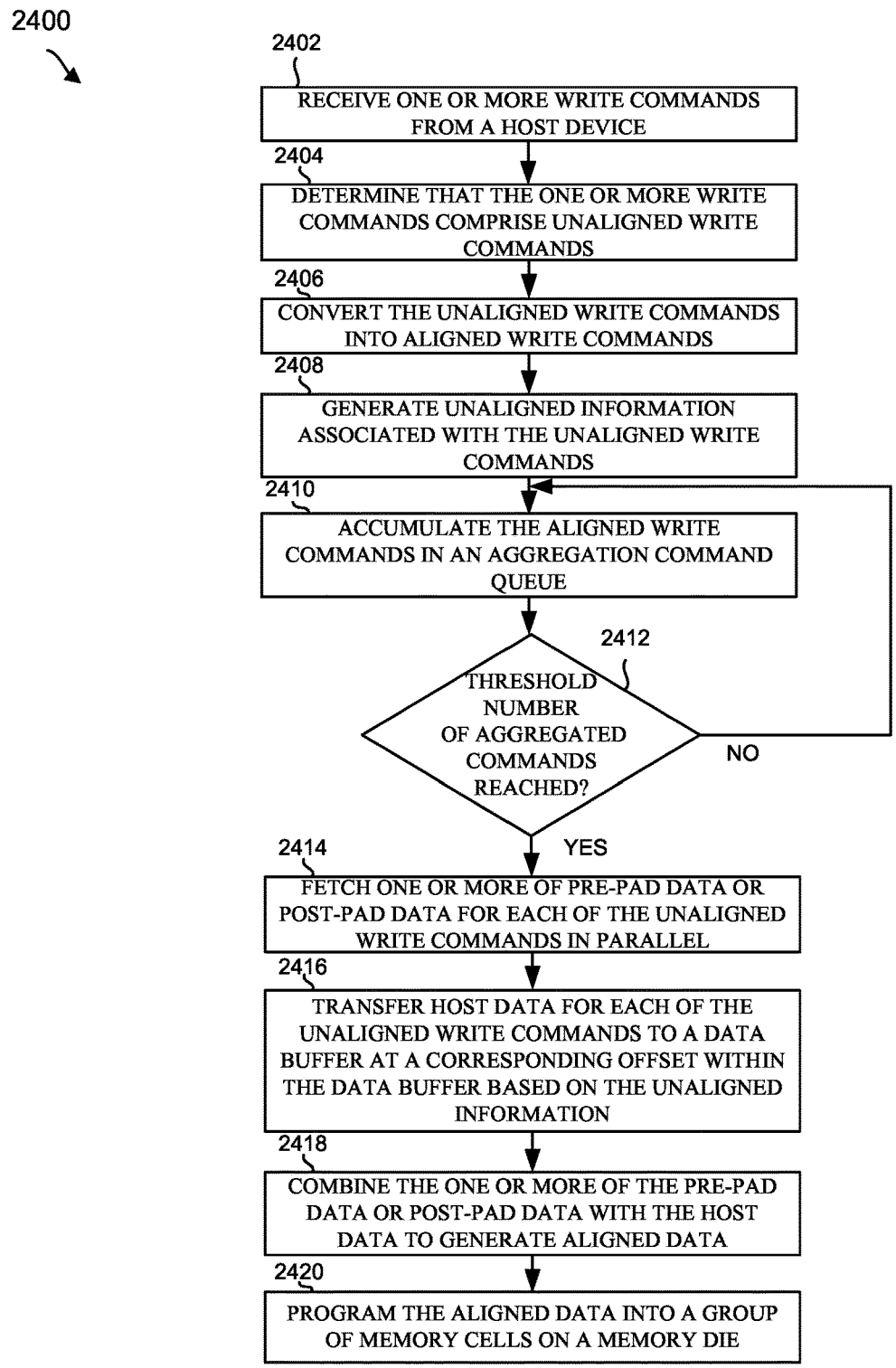
FIG. 24 depicts a flow chart of a process for unaligned write handling in an aligned command based firmware architecture.

FIG. 24 depicts a flow chart of a process 2400 for unaligned write handling in an aligned command based firmware architecture, as performed by the storage device of FIG. 10. For example, example, the process 2400 can be carried out in a storage device 1002 such as the one illustrated in FIG. 10. Each of the steps in the flow chart can be controlled using a controller as described below (e.g. the memory controller 1023), by a component or module of the controller, or by some other suitable means.

At 2402, the controller receive one or more host write commands from a host device. At 2404, the controller determines that the one or more host write commands comprise unaligned write commands. In some aspects, the controller may identify which of the one or more host write commands is an unaligned host write command or an aligned host write command. For example, the controller can determine that at least one of the one or more host write commands is an unaligned host write command based on one or more of a start offset that does not align with a corresponding host data offset or a command length that is not a multiple of a minimum write unit length.

At 2406, the controller converts the unaligned write commands into aligned write commands. In some aspects, the controller can generate an aligned host write command for each of the one or more host write commands identified as an unaligned host write command.

At 2408, the controller generates unaligned information associated with the unaligned write commands, the unaligned information indicating offset information for each of the unaligned write commands. In some aspects, the unaligned information indicates that the predefined offsets comprise non-zero offset values for one or more of pre-pad sectors or post-pad sectors associated with each of the one or more host write commands identified as an unaligned host write command. In some aspects, the unaligned information indicates that the predefined offsets comprise zeroed offset values and exclude non-zero offset values for each pre-pad sector and post-pad sector associated with each of the one or more host write commands identified as an aligned host write command. In some aspects, for each of the unaligned host write commands, the unaligned information indicates one or more of start offset information, which host sectors are missing from the unaligned host write commands, pre-pad sector information or post-pad sector information.

At 2410, the controller accumulates the aligned write commands in an aggregation command queue. In some aspects, the controller may initiate a host data transfer request for a corresponding unaligned host write command upon the corresponding unaligned host write command being aggregated in an aggregation command queue.

At 2412, the controller determines whether the aggregation command queue has accumulated a transfer size of the aligned write commands that corresponds to a threshold size of aggregated command transfer sizes. If the aggregation command queue has accumulated the number of the aligned write commands that corresponds to the threshold size of aggregated command transfer sizes, then the process 2400 proceeds to block 2414. Otherwise, the process 2400 reverts back to the start of block 2410 to resume accumulation of aligned write commands at the aggregation command queue. At 2414, the controller fetches one or more of pre-pad data or post-pad data for each of the unaligned write commands in parallel when the aggregation command queue has accumulated a transfer size of the aligned write commands that corresponds to the threshold size of aggregated command transfer sizes. For example, the controller may perform pre-pad/post-pad sector read operations for each of the unaligned host write commands, concurrently, when the aggregation command queue has accumulated the transfer size of the aligned host write commands that corresponds to the threshold size of aggregated command transfer sizes.

At 2416, the controller transfers host data for each of the unaligned write commands to a data buffer at a corresponding offset within the data buffer based on the unaligned information. At 2418, the controller combines the one or more of the pre-pad data or post-pad data with the host data to generate aligned data. At 2420, the controller programs the aligned data into at least one of the plurality of memory dies.

Figure 25:
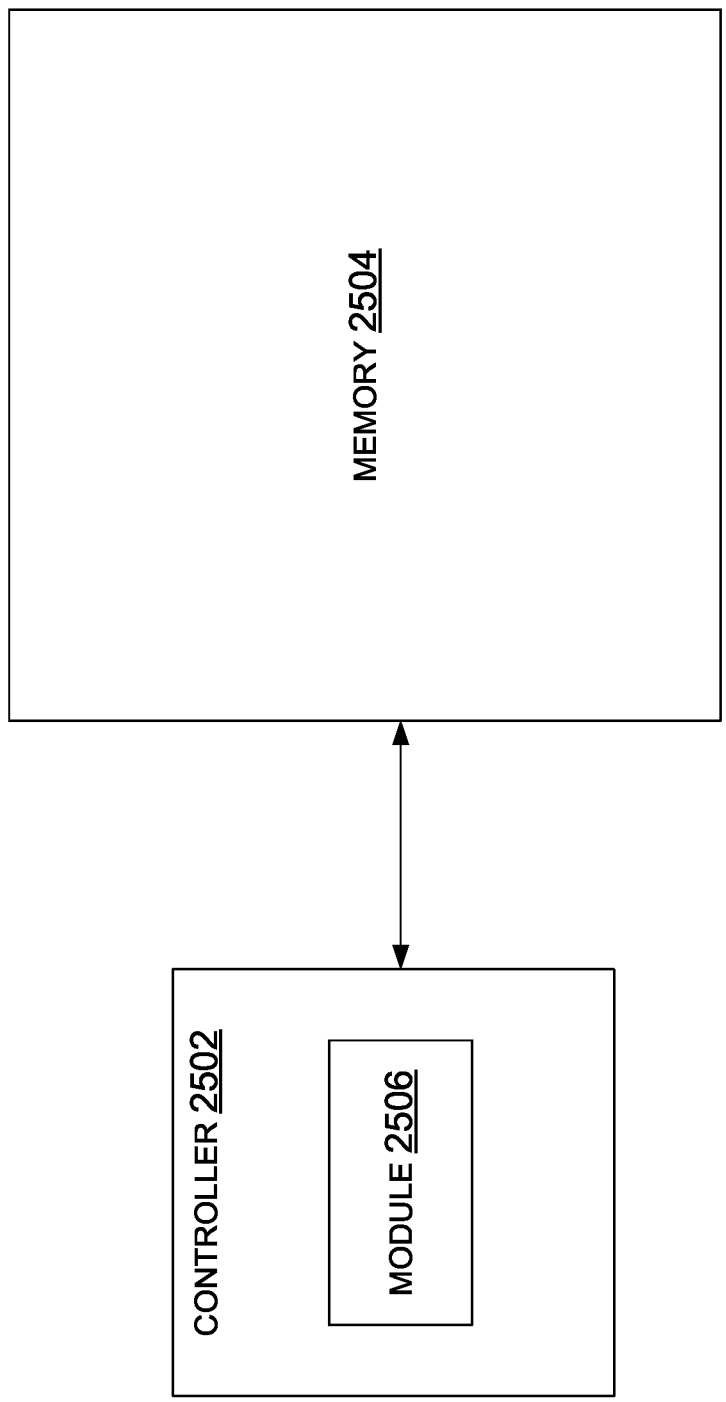
FIG. 25 is a conceptual diagram illustrating an example of a controller facilitating unaligned write handling in an aligned command based firmware architecture.

FIG. 25 is a conceptual diagram illustrating an example of a controller facilitating unaligned write handling in an aligned command based firmware architecture. As illustrated in FIG. 25, a controller 2502 coupled to a memory 2504 in a storage device. For example, controller 2502 may correspond to controller 1023 and memory 2504 may correspond to the NVM 1010 of the storage device 1002 in FIG. 10. The controller may be implemented in software, hardware, or a combination of hardware and software. In one exemplary embodiment, the controller is implemented with several software modules executed on one or more processors, but as those skilled in the art will appreciate, the controller may be implemented in different ways. The skilled artisan will readily understand how best to implement the controller based on the particular design parameters of the system.

The controller 2502 may include a module 2506 that may provide a means for receiving one or more host write commands from a host device. The module 2506 may include a means for determining that the one or more host write commands comprise unaligned write commands. The module 2506 may include a means for converting the unaligned write commands into aligned write commands. The module 2506 may include a means for generating unaligned information associated with the unaligned write commands. In some aspects, the unaligned information indicating offset information for each of the unaligned write commands. The module 2506 may include a means for accumulating the aligned write commands in an aggregation command queue. The module 2506 may include a means for determining whether the aggregation command queue has accumulated a transfer size of the aligned write commands that corresponds to a threshold size of aggregated command transfer sizes, and means for fetching one or more of pre-pad data or post-pad data for each of the unaligned write commands in parallel when the aggregation command queue has accumulated a transfer size of the aligned write commands that corresponds to the threshold size of aggregated command transfer sizes. The module 2506 may include a means for transferring host data for each of the unaligned write commands to a data buffer at a corresponding offset within the data buffer based on the unaligned information. The module 2506 may include a means for combining the one or more of the pre-pad data or post-pad data with the host data to generate aligned data. The module 2506 may include a means for programming the aligned data into at least one of the plurality of memory dies.

Accordingly, the controller described in the present disclosure improves memory programming performance of the storage device by processing unaligned write commands in hardware accelerated write caching in an aligned command based firmware architecture while minimizing the pre-pad/post-pad read latencies. For instance, the controller may convert unaligned write commands into aligned write commands to be handled with the aligned command based firmware architecture and handling pre-pad/post-read read operations in parallel to reduce the latency in fetching pre-pad/post-pad sector data for preparing host data for NAND programming. Accordingly, the unaligned write commands in hardware accelerated write caching in an aligned command based firmware architecture may be accomplished with minimal changes to controller logic and memory capacity requirements.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other magnetic storage devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) in the United States, or an analogous statute or rule of law in another jurisdiction, unless the element is expressly recited using the phrase "means for" or, in the case of a method claim, the element is recited using the phrase "step for."

What is claimed is:

1. A storage device, comprising:
   a memory; and
   one or more processors coupled to the memory, the one or more processors, individually or in combination, configured to:
   convert unaligned host write commands to pass for aligned host write commands, wherein to convert includes that, for each respective one of the unaligned host write commands, at least one parameter of the respective one of the unaligned host write commands is adjusted to generate a respective aligned host write command including a same amount of corresponding host data as the respective one of the unaligned host write commands, the unaligned host write commands being converted prior to triggering of pre-pad sector read operations or post-pad sector read operations to generate aligned data for the aligned host write commands;
   generate unaligned information associated with the unaligned host write commands, the unaligned information indicating offset information for the each of the unaligned host write commands;
   accumulate the aligned host write commands up to a threshold size of aggregated command transfer sizes;

transfer host data to a data buffer at predefined offsets based on the unaligned information for each corresponding aligned host write command, wherein the aligned host write commands are accumulated prior to triggering of the pre-pad sector read operations or the post-pad sector read operations;

modify the data buffer to add pad data to empty sectors within the data buffer based on the predefined offsets included in the unaligned information; and program a memory die in the memory with the host data in the modified data buffer.

2. The storage device of claim 1, wherein the one or more processors configured to convert the unaligned host write commands comprises to, individually or in combination:

receive one or more host write commands from a host device;

identify which of the one or more host write commands is an unaligned host write command or an aligned host write command; and adjust a start offset to align with a corresponding host data offset, or a command length to be a multiple of a minimum write unit length, for each of the one or more host write commands identified as an unaligned host write command, the at least one parameter including the start offset and the command length.

3. The storage device of claim 2, wherein the one or more processors are further configured to, individually or in combination, determine that at least one of the one or more host write commands is an unaligned host write command based on one or more of the start offset that does not align with the corresponding host data offset or the command length that is not the multiple of the minimum write unit length.

4. The storage device of claim 2, wherein the unaligned information indicates that the predefined offsets comprise non-zero offset values for one or more of pre-pad sectors or post-pad sectors associated with each of the one or more host write commands identified as an unaligned host write command.

5. The storage device of claim 2, wherein the unaligned information indicates that the predefined offsets comprise zeroed offset values and exclude non-zero offset values for each pre-pad sector and post-pad sector associated with each of the one or more host write commands identified as an aligned host write command.

6. The storage device of claim 1, wherein, for each of the unaligned host write commands, the unaligned information indicates one or more of start offset information, which host sectors are missing from the unaligned host write commands, pre-pad sector information or post-pad sector information.

7. The storage device of claim 1, wherein the one or more processors are further configured to, individually or in combination, initiate a host data transfer request for a corresponding unaligned host write command upon the corresponding unaligned host write command being aggregated in an aggregation command queue.

8. The storage device of claim 7, wherein the pad data comprises one or more of pre-pad sector data or post-pad sector data, wherein the one or more processors are further configured to, individually or in combination:

determine whether the aggregation command queue has accumulated a transfer size of the aligned host write commands that corresponds to the threshold size of aggregated command transfer sizes; and perform the pre-pad sector read operations or the post-pad sector read operations for each of the unaligned host write commands, concurrently, when the aggregation command queue has accumulated the transfer size of the aligned host write commands that corresponds to the threshold size of aggregated command transfer sizes.

9. The storage device of claim 1, wherein the one or more processors are configured to modify the data buffer, individually or in combination, by combining the pad data with the host data to generate aligned data.

10. A storage device, comprising:

a memory comprising a plurality of memory dies; and one or more processors coupled to the memory, the one or more processors, individually or in combination, configured to:

receive one or more host write commands from a host device;

determine that the one or more host write commands comprise unaligned host write commands;

mark the unaligned host write commands as aligned write commands, wherein to mark includes that, for each respective one of the unaligned host write commands, one or more parameters of the respective one of the unaligned host write commands are adjusted to generate a respective aligned write command including a same amount of corresponding host data as the respective one of the unaligned host write commands, the unaligned host write commands being marked prior to fetching of pre-pad data or post-pad data to generate aligned data for the aligned write commands;

generate unaligned information associated with the unaligned write commands, the unaligned information indicating offset information for the each of the unaligned host write commands;

accumulate the aligned write commands in an aggregation command queue;

determine whether the aggregation command queue has accumulated a transfer size of the aligned write commands that corresponds to a threshold size of aggregated command transfer sizes;

fetch one or more of the pre-pad data or the post-pad data for each of the unaligned host write commands in parallel when the aggregation command queue has accumulated the transfer size of the aligned write commands that corresponds to the threshold size of aggregated command transfer sizes;

transfer host data for each of the unaligned write commands to a data buffer at a corresponding offset within the data buffer based on the unaligned information;

combine the one or more of the pre-pad data or the post-pad data with the host data to generate the aligned data; and program the aligned data into at least one of the plurality of memory dies.

11. The storage device of claim 10, wherein the one or more processors are further configured to, individually or in combination, determine that at least one of the one or more host write commands is an unaligned host write command based on one or more of a start offset that does not align with a corresponding host data offset or a command length that is not a multiple of a minimum write unit length, the one or more parameters including the start offset and the command length.

12. The storage device of claim 10, wherein the unaligned information indicates predefined offsets comprising non-zero offset values for one or more of pre-pad sectors or post-pad sectors associated with each of the one or more host write commands identified as an unaligned host write command.

13. The storage device of claim 10, wherein the unaligned information indicates predefined offsets comprising zeroed offset values and excluding non-zero offset values for each pre-pad sector and post-pad sector associated with each of the one or more host write commands identified as an aligned host write command.

14. The storage device of claim 10, wherein, for each of the unaligned host write commands, the unaligned information indicates one or more of start offset information, which host sectors are missing from the unaligned host write commands, pre-pad sector information or post-pad sector information.

15. The storage device of claim 10, wherein the one or more processors are further configured to, individually or in combination, initiate a host data transfer request for a corresponding unaligned host write command upon the corresponding unaligned host write command being aggregated in the aggregation command queue.

16. A storage device, comprising:
a plurality of memory dies; and
one or more processors coupled to the plurality of memory dies, the one or more processors, individually or in combination, configured to:
adjust parameters of unaligned host write commands to identify with aligned write commands, wherein to adjust includes that, for each respective one of the unaligned host write commands, the parameters including a start offset and a command length of the respective one of the unaligned host write commands are adjusted to generate a respective aligned write command including a same amount of corresponding host data as the respective one of the unaligned host write commands, the unaligned host write commands being adjusted prior to fetching of pre-pad data or post-pad data to generate aligned data for the aligned write commands;
generate unaligned information associated with the unaligned host write commands, the unaligned information indicating offset information for the each of the unaligned host write commands;
accumulate a threshold size of aligned write command transfer sizes in an aggregation command queue;
fetch one or more of the pre-pad data or the post-pad data for each of the unaligned host write commands in parallel based on the aggregation command queue having accumulated the threshold size of the aligned write command transfer sizes;
transfer host data for each of the unaligned host write commands to a data buffer at a corresponding offset within the data buffer based on the unaligned information;
generate the aligned data using the one or more of the pre-pad data or the post-pad data combined with the host data; and
perform a write operation that programs the aligned data into at least one of the plurality of memory dies.

17. The storage device of claim 16, wherein the one or more processors are further configured to, individually or in combination, receive one or more host write commands from a host device, and to determine that at least one of the one or more host write commands is an unaligned host write command based on one or more of the start offset that does not align with a corresponding host data offset or the command length that is not a multiple of a minimum write unit length.

18. The storage device of claim 17, wherein the unaligned information indicates predefined offsets comprising non-zero offset values for one or more of pre-pad sectors or post-pad sectors associated with each of the one or more host write commands determined as an unaligned host write command.

19. The storage device of claim 17, wherein the unaligned information indicates predefined offsets comprising zeroed offset values and excluding non-zero offset values for each pre-pad sector and post-pad sector associated with each of the one or more host write commands that are aligned host write commands.

20. The storage device of claim 16, wherein the one or more processors are further configured to, individually or in combination, initiate a host data transfer request for a corresponding unaligned host write command upon the corresponding unaligned host write command being aggregated in the aggregation command queue.

* * * * *